(12) United States Patent
Ueda

(10) Patent No.: US 8,778,557 B2
(45) Date of Patent: Jul. 15, 2014

(54) MEMBRANE ELECTRODE ASSEMBLY FOR FUEL CELL AND FUEL CELL USING THE SAME

(75) Inventor: Hideyuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 28 days.

(21) Appl. No.: 13/581,244

(22) PCT Filed: Nov. 14, 2011

(86) PCT No.: PCT/JP2011/006336
§ 371 (c)(1),
(2), (4) Date: Aug. 24, 2012

(87) PCT Pub. No.: WO2012/098606
PCT Pub. Date: Jul. 26, 2012

(65) Prior Publication Data
US 2012/0315567 A1    Dec. 13, 2012

(30) Foreign Application Priority Data

Jan. 18, 2011   (JP) ................................. 2011-007789
Jan. 18, 2011   (JP) ................................. 2011-007790

(51) Int. Cl.
*H01M 8/10*          (2006.01)
(52) U.S. Cl.
USPC ......................................................... 429/481
(58) Field of Classification Search
CPC ................................. H01M 4/86; H01M 8/10
USPC ................................................. 429/400–535
See application file for complete search history.

(56) References Cited

FOREIGN PATENT DOCUMENTS

| | | | | |
|---|---|---|---|---|
| JP | 1-286256 A | 11/1989 | | |
| JP | 07-296818 | * 11/1995 | | H01M 4/86 |
| JP | 7-296818 A | 11/1995 | | |
| JP | 2005-071755 | * 3/2005 | | H01M 4/86 |
| JP | 2005-071755 A | 3/2005 | | |
| JP | 2005-310660 A | 11/2005 | | |
| JP | 2007-227031 A | 9/2007 | | |
| JP | 2008-300133 A | 12/2008 | | |

OTHER PUBLICATIONS

English Translation of JP 2005-071755.*
English Translation of JP07-296818.*
International Search Report issued in International Application No. PCT/JP2011/006336 issued on Dec. 20, 2011.

* cited by examiner

*Primary Examiner* — Patrick Ryan
*Assistant Examiner* — Kiran Quraishi
(74) *Attorney, Agent, or Firm* — McDermott Will & Emery LLP

(57) ABSTRACT

Disclosed is a membrane electrode assembly for a fuel cell including an anode, a cathode, and an electrolyte membrane disposed therebetween. The anode includes an anode catalyst layer laminated on one principal surface of the electrolyte membrane, and an anode diffusion layer laminated on the anode catalyst layer. The cathode includes a cathode catalyst layer laminated on the other principal surface of the electrolyte membrane, and a cathode diffusion layer laminated on the cathode catalyst layer. At least one of the anode and cathode diffusion layers includes a conductive porous substrate, a porous composite layer laminated on the conductive porous substrate at the catalyst layer side, and a modified layer disposed on the porous composite layer at the catalyst layer side. The porous composite layer includes a conductive carbon material, and a first water-repellent resin material. The modified layer includes a second water-repellent resin material having a needle-like shape.

17 Claims, 5 Drawing Sheets

F I G. 7
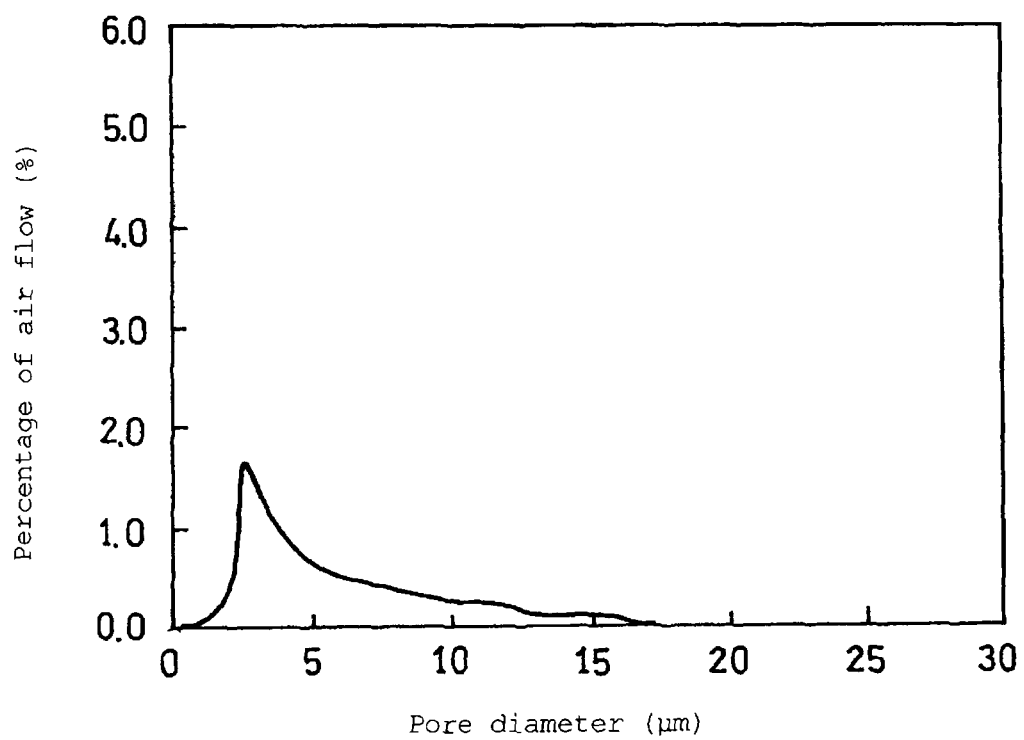

MEMBRANE ELECTRODE ASSEMBLY FOR FUEL CELL AND FUEL CELL USING THE SAME

TECHNICAL FIELD

The present invention relates to a membrane electrode assembly including an anode, a cathode, and an electrolyte membrane interposed therebetween, and specifically to an improvement of diffusion layers included in the cathode and the anode.

BACKGROUND ART

Among fuel cells, direct oxidation fuel cells in which a liquid fuel such as methanol or dimethyl ether is directly supplied to the anode without being reformed to hydrogen gas have been receiving attention. A direct oxidation fuel cell includes a pair of separators and a membrane electrode assembly (MEA) interposed therebetween.

The MEA includes an anode, a cathode, and an electrolyte membrane interposed therebetween. The anode and the cathode each include a catalyst layer and a diffusion layer. To the anode, a fuel and water are supplied, while to the cathode, an oxidant gas (e.g., oxygen gas or air) is supplied. At the anode, the fuel reacts with water to produce carbon dioxide, protons and electrons. The protons pass through the electrolyte membrane to reach the cathode, while the electrons travel through an external circuit to reach the cathode. At the cathode, oxygen reacts with protons and electrons to produce water.

If the produced water accumulates in the cathode in a large amount, the diffusibility of oxidant gas therein is reduced, and the power generation performance of the fuel cell is deteriorated. In order to address this problem, Patent Literature 1 suggests forming a porous composite layer having water repellency, on a surface of the conductive porous substrate constituting the cathode diffusion layer. The constituent material of the porous composite layer disclosed in Patent Literature 1 is a fluorocarbon polymer, such as a copolymer having a tetrafluoroethylene unit and a propylene unit, or a copolymer having a vinylidene fluoride unit and a hexafluoropropylene unit. It is considered that the diffusibility of oxidant gas in the cathode is improved by forming such a porous composite layer.

On the other hand, in view of achieving favorable power generation performance of a fuel cell, it is also important to ensure the diffusibility of fuel in the anode. If the fuel diffusibility is insufficient, the fuel tends to be distributed unevenly in the anode. In this case, in a region where a large amount of fuel is locally distributed, methanol crossover (MCO), a phenomenon in which the methanol used as fuel passes in an unreacted state through the electrolyte membrane to reach the cathode, is likely to occur. The occurrence of MCO leads to an occurrence of fuel loss and reduction in potential at the cathode, resulting in deterioration in power generation performance. On the other hand, in a region where the amount of fuel is small, the power generation reaction does not proceed sufficiently, and the power generation performance is deteriorated.

In order to address this problem, Patent Literature 1 suggests forming a porous composite layer having water repellency on a surface of the conductive porous substrate constituting the anode diffusion layer, as formed in the cathode. It is considered that the uniform diffusibility of fuel in the anode is improved by forming such a porous composite layer.

The catalyst layer includes catalyst metal fine particles or a conductive carbon material (carrier) supporting catalyst metal fine particles, and a polymer electrolyte, and is comparatively highly hydrophilic. On the other hand, according to Patent Literature 1, the porous composite layer as mentioned above, because of the inclusion of a water-repellent material such as a fluorocarbon polymer, tends to have a low critical surface tension. As a result, the interface bonding strength between the catalyst layer and the porous composite layer is likely to be insufficient. In order to ensure a sufficient interface bonding strength between the catalyst layer and the porous composite layer, various studies have been made.

For example, Patent Literature 2 suggests forming a first porous composite layer and a second porous composite layer which is less water repellent than the first porous composite layer, between the catalyst layer and the conductive porous substrate. In Patent Literature 2, the second porous composite layer with poor water repellency is disposed in contact with the catalyst layer.

Patent Literature 3 suggests applying hydrophilic treatment to a surface of the porous composite layer in contact with the catalyst layer, to form a hydrophilic portion, and bonding the hydrophilic portion to the catalyst layer.

CITATION LIST

Patent Literature

[PTL 1] Japanese Laid-Open Patent Publication No. 2005-310660
[PTL 2] Japanese Laid-Open Patent Publication No. 2005-71755
[PTL 3] Japanese Laid-Open Patent Publication No. 2008-300133

SUMMARY OF INVENTION

Technical Problem

In Patent Literatures 2 and 3, the water repellency of a portion of the anode and cathode porous composite layers to be bonded to the catalyst layer is intentionally reduced, so that the interface bonding strength between the porous composite layer and the catalyst layer is ensured. However, when such a method is employed, due to the reduced water repellency, the fuel diffusibility is deteriorated at the anode. At the cathode, due to the reduced water repellency, the produced water is unlikely to be smoothly discharged outside, and the diffusibility of oxidant gas is deteriorated. As described above, there is a trade-off relationship between the interface bonding strength between the porous composite layer and the catalyst layer, and the power generation performance of a fuel cell obtained by ensuring the water repellency, and it is impossible to improve the interface bonding strength and the power generation performance at the same time by the conventional methods.

In view of the above, the present invention intends to improve, in a membrane electrode assembly for a fuel cell, the interface bonding strength between the porous composite layer having water repellency and at least one of the anode and cathode catalyst layers.

Solution to Problem

One aspect of the present invention relates to a membrane electrode assembly for a fuel cell, including an anode, a cathode, and an electrolyte membrane disposed between the anode and the cathode, the anode including an anode catalyst layer laminated on one principal surface of the electrolyte membrane, and an anode diffusion layer laminated on the anode catalyst layer, and the cathode including a cathode catalyst layer laminated on the other principal surface of the electrolyte membrane, and a cathode diffusion layer laminated on the cathode catalyst layer, at least one of the anode diffusion layer and the cathode diffusion layer including a conductive porous substrate, a porous composite layer laminated on the conductive porous substrate at the catalyst layer side, and a modified layer disposed on the porous composite layer at the catalyst layer side, the porous composite layer including a conductive carbon material, and a first water-repellent resin material, and the modified layer including a second water-repellent resin material having a needle-like shape.

Another aspect of the present invention relates to a fuel cell including at least one unit cell which includes the abovementioned membrane electrode assembly for a fuel cell, an anode-side separator in contact with the anode, and a cathode-side separator in contact with the cathode.

Advantageous Effects of Invention

According to the present invention, it is possible to improve, in a membrane electrode assembly for a fuel cell, the interface bonding strength between the porous composite layer and at least one of the anode and cathode catalyst layers, without impairing the water repellency of the porous composite layer included in the anode and the cathode.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 7 A graph for explaining the pore throat size distribution measured using a permporometer.

DESCRIPTION OF EMBODIMENTS

A membrane electrode assembly for a fuel cell according to the present invention includes an anode, a cathode, and an electrolyte membrane disposed between the anode and the cathode. The anode includes an anode catalyst layer laminated on one principal surface of the electrolyte membrane, and an anode diffusion layer laminated on the anode catalyst layer, and the cathode includes a cathode catalyst layer laminated on the other principal surface of the electrolyte membrane, and a cathode diffusion layer laminated on the cathode catalyst layer. At least one of the anode diffusion layer and the cathode diffusion layer includes a conductive porous substrate, and a porous composite layer disposed on a surface thereof facing the cathode catalyst layer, and the porous composite layer includes a conductive carbon material, and a first water-repellent resin material.

The porous composite layer, because of the inclusion of the first water-repellent resin material, is low in critical surface tension and has water repellency. On the other hand, the anode and cathode catalyst layers have comparatively high hydrophilicity. As such, the interface bonding strength between the porous composite layer and the anode or cathode catalyst layer tends to be insufficient. Therefore, in the present invention, a modified layer is formed on the porous composite layer included in at least one of the anode and cathode diffusion layers, so as to face the anode catalyst layer or the cathode catalyst layer.

The modified layer includes a second water-repellent resin material having a needle-like shape. Specifically, a second water-repellent resin material having a needle-like shape is disposed as the modified layer between the porous composite layer and at least one of the anode and cathode diffusion layers. The "needle-like shape" as used herein refers to a shape having a major axis and a minor axis, such as a shape of a short fiber. It should be noted that, as described specifically below, the porous composite layer and the anode or cathode catalyst layer are not insulated from each other by the modified layer, and they are at least partially in direct contact with each other.

In other words, the bonding between the porous composite layer and the anode or cathode catalyst layer is assisted by the modified layer, and this improves the interface bonding strength therebetween. As a result, the porous composite layer is unlikely to be separated from the anode or cathode catalyst layer, and an increase in internal resistance is suppressed. As such, in the cathode catalyst layer, due to little space between the cathode catalyst layer and the porous composite layer, produced water is less likely to stay therein, and a reduction in oxidant gas diffusibility is suppressed. On the other hand, in the anode catalyst layer, due to little space between the anode catalyst layer and the porous composite layer, the uniform diffusibility of fuel is improved.

Figure 1:
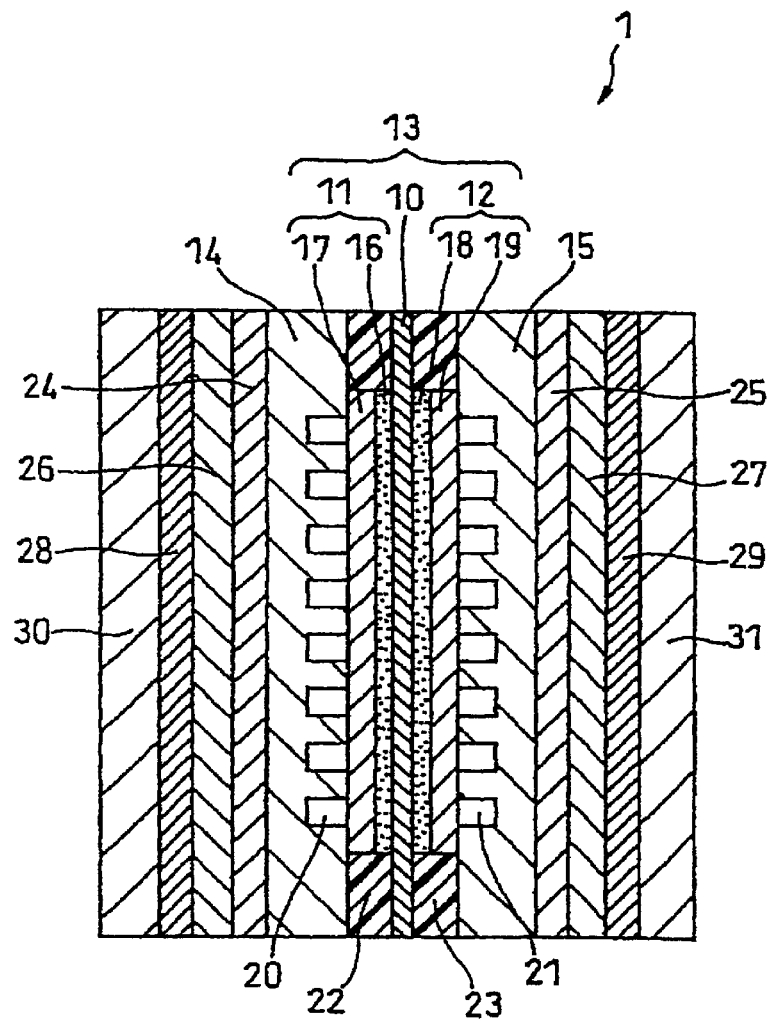
FIG. 1 A longitudinal cross-sectional view schematically showing the configuration of a fuel cell according to one embodiment of the present invention.

The membrane electrode assembly of the present invention and a fuel cell using the same are described below with reference to the appended drawings. FIG. 1 is a longitudinal cross-sectional view schematically showing the configuration of a fuel cell according to one embodiment of the present invention.

A fuel cell 1 shown in FIG. 1 comprises one unit cell. The unit cell includes: a membrane electrode assembly (MEA) 13 including an electrolyte membrane 10, and an anode 11 and a cathode 12 sandwiching the electrolyte membrane 10; and an anode-side separator 14 and a cathode-side separator 15 sandwiching the MEA 13.

The anode 11 includes an anode catalyst layer 16 disposed on one principal surface of the electrolyte membrane 10, and an anode diffusion layer 17 laminated on the anode catalyst layer 16. The anode diffusion layer 17 includes a conductive porous substrate, a porous composite layer laminated on one surface of the conductive porous substrate facing the anode catalyst layer 16, and a modified layer disposed on one surface of the porous composite layer facing the anode catalyst layer 16. The other surface of the conductive porous substrate is in contact with the anode-side separator 14.

The cathode 12 includes a cathode catalyst layer 18 disposed on the other principal surface of the electrolyte membrane 10, and a cathode diffusion layer 19 laminated on the cathode catalyst layer 18. The cathode diffusion layer 19 includes a conductive porous substrate, a porous composite layer laminated on one surface of the conductive porous substrate facing the cathode catalyst layer 18, and a modified layer disposed on one surface of the porous composite layer facing the cathode catalyst layer 18. The other surface of the conductive porous substrate is in contact with the cathode-side separator 15. It should be noted that the modified layer may be formed only on one of the anode and cathode diffusion layers 17 and 19.

The anode-side separator 14 has, on its surface facing the anode 11, a flow channel 20 for supplying a fuel to the anode and discharging the unused fuel and reaction products (e.g., carbon dioxide). The cathode-side separator 15 has, on its surface facing the cathode 12, a flow channel 21 for supplying an oxidant to the cathode and discharging the unused oxidant and reaction products. The oxidant is, for example, oxygen gas, or a mixed gas containing oxygen gas, such as air. Usually, the oxidant is air.

An anode-side gasket 22 is disposed around the anode 11 so as to seal the anode 11. Likewise, a cathode-side gasket 23 is disposed around the cathode 12 so as to seal the cathode 12. The anode-side gasket 22 and the cathode-side gasket 23 face each other with the electrolyte membrane 10 therebetween. The anode-side gasket 22 and the cathode side gasket 23 prevent leakage of the fuel, oxidant and reaction products to outside.

The fuel cell 1 of FIG. 1 further includes current collector plates 24 and 25, sheet heaters 26 and 27, electrically insulating plates 28 and 29, and end plates 30 and 31, which are stacked in a direction perpendicular to the plane direction of the anode-side separator 14 and the cathode-side separator 15. These elements of the fuel cell 1 are integrated by a clamping means (not shown).

Figure 2A:
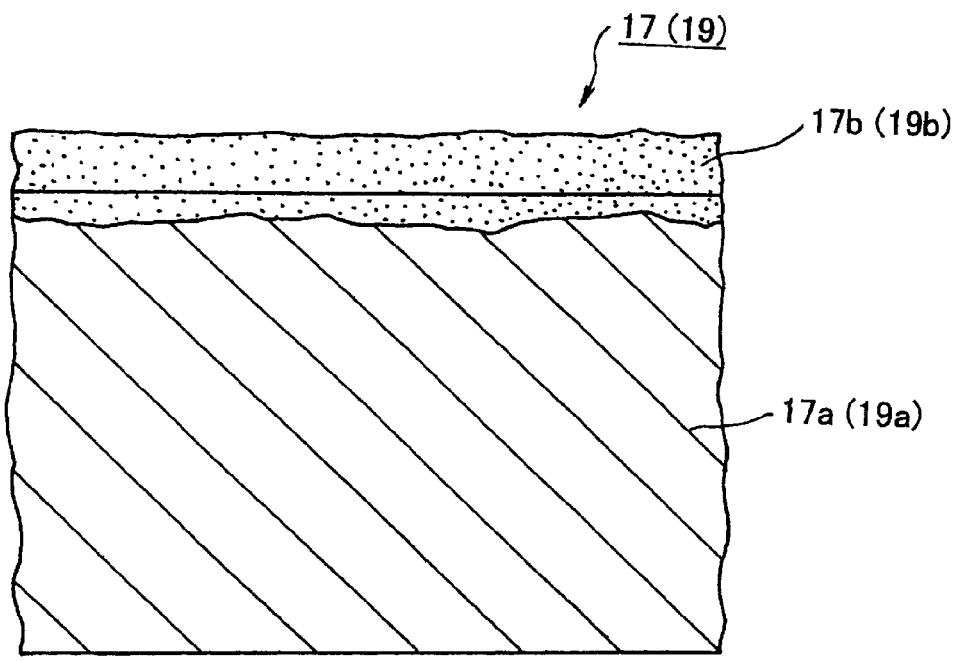
FIG. 2A An enlarged schematic diagram of a portion of an anode or cathode diffusion layer included in the fuel cell of FIG. 1.
Figure 2B:
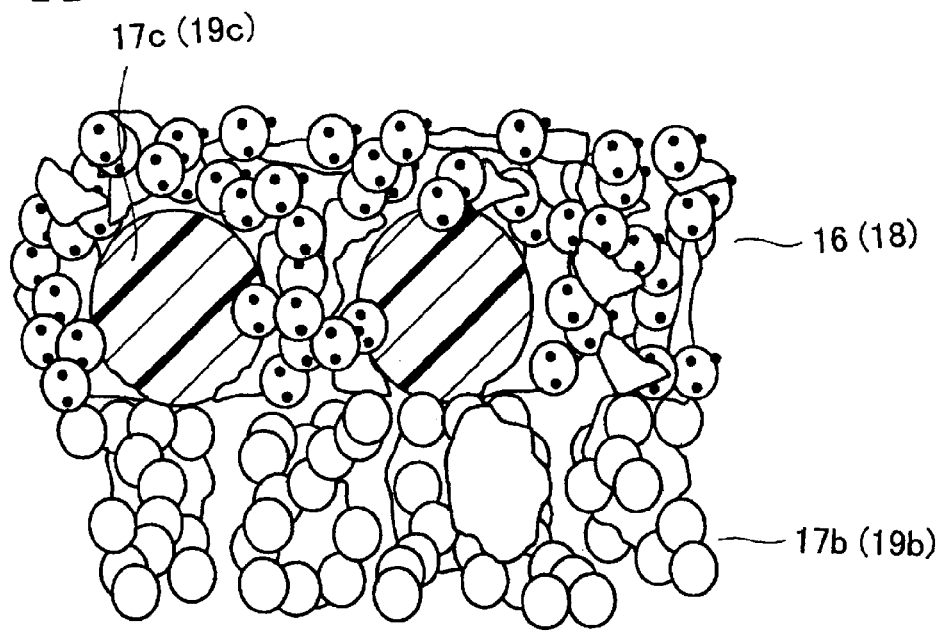
FIG. 2B An enlarged schematic diagram of a portion of the anode or cathode catalyst layer and a porous composite layer included in the fuel cell of FIG. 1.

With regard to the improvement of the interface bonding strength by the modified layer, a description is given below with reference to FIGS. 2A and 2B. FIG. 2A is an enlarged schematic diagram of a portion of the anode or cathode diffusion layer 17 or 19, and FIG. 2B is an enlarged schematic diagram of a portion around the bonded interface between the anode or cathode catalyst layer 16 or 18 and the porous composite layer 17b or 19b. In FIG. 2B, the major axis direction of the needle-like second water-repellent resin material (the modified layer 17c or 19c) is perpendicular to the drawing sheet.

The description below uses the anode catalyst layer 16 and the modified layer 17c on the anode side as examples for explanation. As shown in FIG. 2B, the anode catalyst layer 16 partially enters the gaps in the modified layer 17c, and contacts with the porous composite layer 17b, without an intermediate of the modified layer 17c. Since the modified layer 17c is formed of a needle-like second water-repellent resin material, gaps are easily formed by reducing the overlap of the second water-repellent resin material in the thickness direction of the anode. Preferably, the amount of the second water-repellent resin material to be attached to the surface of the porous composite layer is set appropriately so that the above gaps can be obtained. As described above, when the second water-repellent resin material is in the needle-like shape or in the form of short fibers, the overlapping state can be easily controlled, and optimum gaps suitable for bonding the anode catalyst layer 16 and the porous composite layer 17b together can be easily obtained. On the other hand, when the resin material to be included in the modified layer is mainly composed of flaky particles or the like, optimum gaps are difficult to obtain, and the anchor effect as described below is also difficult to obtain sufficiently.

The entry of the anode catalyst layer 16 into the gaps in the modified layer 17c allows the anchor effect to appear, improving the interface bonding strength between the anode catalyst layer 16 and the porous composite layer 17b significantly. Further, the needle-like shape of the second water-repellent resin material makes it easy to ensure a sufficient contact area between the anode catalyst layer 16 and the porous composite layer 17b. The porous composite layer 17b and the modified layer 17c both have excellent water repellency. Because of this, it is possible to obtain excellent water repellency in the anode diffusion layer and interface bonding strength between the anode catalyst layer 16 and the porous composite layer 17b at the same time. It should be noted that the porous composite layer 17b may partially intrude into the conductive porous substrate 17a. The description above applies to the cathode catalyst layer 18 and the modified layer 19c on the cathode side.

As shown in FIG. 2A, in the anode or cathode diffusion layer 17 or 19, the porous composite layer 17b or 19b is disposed over the entire principal surface of the conductive porous substrate 17a facing the anode catalyst layer 16 or the entire principal surface of the conductive porous substrate 19a facing the cathode catalyst layer 18. Preferably, the porous composite layer 17b or 19b uniformly covers the surface of the conductive porous substrate 17a or 19a.

The conductive porous substrate 17a preferably has fuel diffusibility, ability to discharge carbon dioxide produced during power generation, and electron conductivity. The conductive porous substrate 19a is preferably excellent in oxidant gas diffusibility and has ability to discharge produced water and excellent electron conductivity. A material for such a substrate may be a porous sheet-like carbon material, such as carbon paper, carbon cross, or carbon nonwoven fabric.

In addition, a water-repellent material may be allowed to adhere to the conductive porous substrates 17a and 19a. The water-repellent material may be, for example, a fluorocarbon polymer, such as polytetrafluoroethylene (PTFE), tetrafluoroethylene-hexafluoropropylene copolymer (FEP), polyvinyl fluoride (PVF), polyvinylidene fluoride (PVDF), or tetrafluoroethylene-perfluoro(alkyl vinyl ether) copolymer (PFA).

The conductive porous substrate 17a and 19a each preferably have a thickness of, for example, 100 to 500 µm, and more preferably 150 to 350 µm. Preferably, the thickness of the conductive porous substrate 17a and 19a is, for example, 5 to 20 times as large as that of the porous composite layer 17b or 19b. The thickness of the conductive porous substrate 17a and 19a is obtained by, for example, measuring the thickness of each substrate at randomly selected 10 points with a constant-pressure thickness meter, and averaging the measured values. The conductive porous substrate 17a and 19a each have a porosity of, for example, 70 to 90%.

The porous composite layers 17b and 19b each include a conductive carbon material and a first water-repellent resin material. By disposing such a porous composite layer on a surface of the conductive porous substrate so as to face the catalyst layer, the uniform diffusibility of fuel is improved in the anode diffusion layer 17. In the cathode diffusion layer 19, water inside the fuel cell is smoothly discharged outside therefrom, and therefore, the diffusibility of oxidant gas is less likely to be reduced. The porous composite layers 17b and 19b can be formed by, for example, applying a paste for porous composite layer including a conductive carbon material, a first water-repellent resin material, and a dispersion medium, on the conductive porous substrate 17a or 19a.

Examples of the conductive carbon material include: particulate carbon materials, such as carbon black or flake graphite; and carbon fibers, such as carbon nanotubes and carbon nanofibers. These conductive carbon materials may be used singly or in combination of two or more. The conductive carbon material preferably has a highly developed porous structure. The primary particles of the conductive carbon material preferably have an average particle diameter (a particle diameter at 50% volume accumulation in a volumetric particle size distribution: D50) of 20 to 40 nm. The specific surface area of the conductive carbon material is preferably 200 to 300 $m^2/g$.

A preferable first water-repellent resin material is a fluorocarbon polymer. Examples of the fluorocarbon polymer include PTFE, FEP, PVF, PVDF, PFA, and tetrafluoroethylene-ethylene copolymer. These fluorocarbon polymers may be used singly or in combination of two or more. Preferred among these is PTFE. PTFE has a large number of chemically stable C—F bonds, and therefore, even though the content of PTFE is small, the inside of the pores of the porous composite layer can be a surface whose interaction with water molecules is weak, i.e., a water repellent surface.

The first water-repellent resin material preferably comprises flaky particles. Flaky particles have a large specific surface area, and therefore, have excellent water repellency. As such, this is effective in suppressing a reduction in oxidant gas diffusibility inside the fuel cell. This also effective in improving the uniform diffusibility of fuel inside the fuel cell.

The inclusion of flaky particles in the porous composite layer can be verified by, for example, observing a surface of the porous composite layer under a scanning electron microscope. The "flaky particles" as used herein are particles having a flat principal surface (a basal surface). When the maximum diameter of the basal surface is denoted as "a", the diameter perpendicular to "a" of the basal surface is denoted as "b", and the maximum thickness of the particle is denoted as "c", the ratio a/b is, for example, 1 to 3, and the ratio a/c is, for example, 5 to 8. The values of a, b and c are each an average value of, for example, 10 particles.

The modified layers 17c and 19c may further include, for example, a flake-like water-repellent resin material, in addition to the needle-like second water-repellent resin material. However, flaky particles are less likely to form gaps between the particles than a needle-like resin material. Because of this, when the modified layers 17c and 19c include a large amount of flaky particles, as compared to when including a large amount of a needle-like resin material, the anchor effect is less likely to be obtained, and in addition, it becomes difficult to ensure a sufficient contact area between the porous composite layer 17b or 19b and the anode or cathode catalyst layer 16 or 18. For this reason, in the case where both a flake-like resin material and a needle-like resin material are included in the modified layers 17c and 19c, the content of the needle-like resin material is preferably larger than that of the flake-like resin material.

In view of achieving both the conductivity and the water repellency in the fuel cell, the porous composite layer 17b and 19b each preferably have an average thickness of 20 to 70 μm. By setting the average thickness of the porous composite layer 17b and 19b to 20 μm or more, favorable water repellency can be obtained. As a result, the produced water can be readily discharged outside and the fuel can diffuse more uniformly. By setting the average thickness of the porous composite layer 17b and 19b to 70 μm or less, cracks and reduction in conductivity are less likely to occur. The average thickness of the porous composite layer 17b and 19b is more preferably 20 to 30 μm. The average thickness is obtained by, for example, measuring the thickness of each layer at randomly selected 10 points with a scanning electron microscope, and averaging the measured values.

The amount of the porous composite layer 17b laminated on the surface of the conductive porous substrate 17a per unit projected area is preferably 1 to 4 $mg/cm^2$, and more preferably 2 to 3 $mg/cm^2$. By setting the amount of the porous composite layer 17b within the foregoing range, the porous composite layer included in the anode can have the functions (1) to reduce the interface contact resistance between the anode catalyst layer and the conductive porous substrate, and (2) to prevent internal short circuits caused by penetration of the conductive porous substrate through the anode catalyst layer and the electrolyte membrane, plus an additional function (3) to control the permeation flux of fuel.

More specifically, by setting the amount of the porous composite layer 17b to 1 $mg/cm^2$ or more, the porous composite layer 17b is likely to uniformly cover the surface of the conductive porous substrate 17a, enabling the abovementioned functions of the porous composite layer 17b to be sufficiently exerted. By setting the amount of the porous composite layer 17b to 4 $mg/cm^2$ or less, cracks are unlikely to occur in the porous composite layer 17b. As a result, the abovementioned functions of the porous composite layer 17b can be sufficiently exerted.

On the other hand, the amount of the porous composite layer 19b laminated on the surface of the conductive porous substrate 19a per unit projected area is preferably 1 to 2.5 $mg/cm^2$. By setting the amount of the porous composite layer 19b within the foregoing range, the porous composite layer 19b included in the cathode 12 can have the functions (1) to prevent the cathode catalyst layer from becoming dry, (2) to reduce the interface contact resistance between the cathode catalyst layer and the conductive porous substrate, and (3) to prevent internal short circuits caused by penetration of the conductive porous substrate through the cathode catalyst layer and the electrolyte membrane, plus an additional function (4) to selectively form water discharge paths to control the water dischargeability.

More specifically, by setting the amount of the porous composite layer 19b to 1 $mg/cm^2$ or more, the porous composite layer 19b is likely to uniformly cover the surface of the conductive porous substrate 19a, enabling the abovementioned functions of the porous composite layer 19b to be sufficiently exerted. By setting the amount of the porous composite layer 19b to 2.5 $mg/cm^2$ or less, cracks are unlikely to occur in the porous composite layer 19b. As a result, the abovementioned functions of the porous composite layer 19b can be sufficiently exerted.

The "amount of the porous composite layer 17b laminated on the surface of the conductive porous substrate 17a per unit projected area" as used herein is a value obtained by dividing the whole weight of the porous composite layer 17b by the area calculated from a profile of the porous composite layer 17b viewed in a direction normal to the principal surface thereof. For example, when the profile of the porous composite layer 17b viewed in the normal direction is rectangular, the area of the porous composite layer 17b can be calculated as (longitudinal length)×(lateral length). In this case, the amount of the porous composite layer 17b per unit projected area is obtained by dividing the whole weight of the porous composite layer 17b by the above area. The amount of the porous composite layer 19b disposed on the surface of the conductive porous substrate 19a per unit projected area can be obtained in the similar manner.

The weight ratio of the first water-repellent resin material in the porous composite layer 17b or 19b is preferably 20 to 50 wt %, and more preferably 35 to 45 wt %. By setting the weight ratio of the first water-repellent resin material in the porous composite layers 17b and 19b to 50 wt % or less, the porous composite layer can have excellent electron conductivity.

On the other hand, by setting the weight ratio of the first water-repellent resin material in the porous composite layer 17b to 20 wt % or more, the water repellency of the inside of the pores of the porous composite layer is ensured, and thus, a favorable uniform diffusibility of fuel is obtained. By setting the weight ratio of the first water-repellent resin material in the porous composite layer 19b to 20 wt % or more, the water repellency of the inside of the pores of the porous composite layer is ensured, which makes water in a liquid state unlikely to stay in the pores. As a result, an improved diffusibility of oxidant gas in the porous composite layer is obtained.

On the surface of the porous composite layer 17b facing the anode catalyst layer 16, the modified layer 17c including the second water-repellent resin material having a needle-like shape is laminated. The presence of the modified layer 17c between the porous composite layer 17b and the anode catalyst layer 16 improves the interface bonding strength therebetween. Likewise, on the surface of the porous composite layer 19b facing the cathode catalyst layer 18, the modified layer 19c including the second water-repellent resin material having a needle-like shape is laminated. The presence of the modified layer 19c between the porous composite layer 19b and the cathode catalyst layer 18 improves the interface bonding strength therebetween. It should be noted that the modified layer may be formed only in one of the anode and diffusion layers. In this case also, at least in the electrode including the modified layer, the effect of the present invention can be sufficiently obtained. However, when the modified layer is formed in both electrodes, the abovementioned effects are synergistically increased as shown in below-described Examples.

The modified layer preferably includes aggregates composed of the second water-repellent resin material. The aggregates are preferably distributed on the surface of the porous composite layer, for example, like islands. The modified layer can be obtained by various methods, such as by allowing a dispersion including the aggregates to adhere to the porous composite layer. For example, it may be obtained by the following method.

The diffusion layer is floated on a dispersion including a second water-repellent resin material or a raw material thereof, with the surface of the porous composite layer being contacted with the dispersion, thereby to allow the second water-repellent resin material or the raw material thereof to adhere to the porous composite layer. The length of time during which the diffusion layer is floated on the dispersion is preferably 2 to 5 minutes. The diffusion layer is then baked at 350 to 370° C. In such a manner, the modified layer including aggregates composed of the second water-repellent resin material which are distributed like islands on the surface of the porous composite layer can be easily formed. At this time, the surface of the porous composite layer has an exposed portion where no aggregates composed of the second water-repellent resin material are formed. The presence of the exposed portion of the porous composite layer makes it easier to ensure the conductivity.

The inclusion of the second water-repellent resin material having a needle-like shape in the modified layer can be verified by, for example, observing a surface of the modified layer 17c or 19c under a scanning electron microscope. Even in the case where the second water-repellent resin material is in the form of aggregates, individual needle-like particles (short fibers) of the second water-repellent resin material can be distinguished from each other, and can be verified using, for example, a scanning electron microscope. With regard to the aspect ratio of the second water-repellent resin material, for example, the ratio of a length in the major axis direction to a length in the minor axis direction is 5:1 to 20:1. The modified layer may contain a small amount of another material (e.g., flaky particles) other than the needle-like second water-repellent resin material. In this case, for example, the ratio by number of the needle-like second water-repellent resin material contained in the modified layer is preferably 90% or more and 100% or less, and more preferably 95 to 100%. The ratio by number of the needle-like second water-repellent resin material can be determined by using, for example, a scanning electron microscope.

A preferable second water-repellent resin material is a fluorocarbon polymer. Examples of the fluorocarbon polymer include those exemplified as the first water-repellent resin material. A particularly preferable second water-repellent resin material is a fluorocarbon polymer containing 95 wt % or more tetrafluoroethylene unit. Such a polymer is exemplified by polytetrafluoroethylene (PTFE).

The second water-repellent resin material having a needle-like shape can be obtained by any method without particular limitation. A resin material including needle-like particles may be used, or alternatively, an appropriately selected resin material whose particles become needle-like when heated may be used by heating it at a predetermined temperature into a needle-like shape. In one possible method, the second water-repellent resin material having a needle-like shape is obtained by heating a fluorocarbon polymer having a high weight average molecular weight and containing 95 wt % or more tetrafluoroethylene unit, at 350 to 370° C. In this method, the fluorocarbon polymer before heating may be of any shape without particular limitation. For example, it may be a fluorocarbon polymer including spherical or flaky particles.

The second water-repellent resin material preferably has a weight average molecular weight higher than that of the first water-repellent resin material. A resin material having a low weight average molecular weight tends to become flake-like, whereas a resin material having a high weight average molecular weight tends to become needle-like. For this reason, by controlling the weight average molecular weight of each of the first and second water-repellent resin materials, it becomes easy to form the first water-repellent resin material into a flake-like shape, and the second water-repellent resin material into a needle-like shape. For example, the weight average molecular weight of the second water-repellent resin material is preferably 100,000 to 1,000,000, and more preferably 200,000 to 1,000,000.

The second water-repellent resin material has a length in the major axis direction of preferably 0.5 μm or more (e.g., 0.5 to 3 μm), and more preferably 1 to 2 μm. Further, the second water-repellent resin material has a length in the minor axis direction of preferably 0.05 to 0.1 μm, and more preferably 0.08 to 0.1 μm. For example, the lengths in the major axis direction and in the minor axis direction of randomly selected 10 particles of the second water-repellent resin material are measured using a scanning electron microscope, and averaging the measured values of each length. The size of particles (short fibers) of the second water-repellent resin material can be controlled by various methods, for example, by preparing a precursor of the modified layer including the second water-repellent resin material or a raw material thereof, and baking the precursor. Specifically, the size can be controlled by changing the conditions for baking a precursor of the modified layer, such as the baking temperature and time. In the case of bringing a dispersion including the second water-repellent resin material or a raw material thereof into contact with the porous composite layer, the size of the second water-repellent resin material can be controlled by changing the solids concentration of the dispersion. In this case, the solids concentration of the dispersion is preferably set to 4 to 20 wt %. In a dispersion having a comparatively high solids concentration, the particles of the raw material of the second water-repellent resin material tend to come close to each other, and the raw material of the second water-repellent resin material is readily polymerized. As a result, the growth of needle-like particles of the second water-repellent resin material is facilitated, and the size is changed.

The amount of the modified layer 17c or 19c disposed on the surface of the porous composite layers 17b and 19b per unit projected area is preferably 0.01 to 0.5 mg/cm$^2$, and more preferably 0.02 to 0.05 mg/cm$^2$. By setting the amount of the modified layers 17c and 19c to 0.01 mg/cm$^2$ or more, the interface bonding strength between the porous composite layer 17b and the anode catalyst layer 16, and the interface bonding strength between the porous composite layer 19b and the cathode catalyst layer 18 are further improved. By setting the amount of the modified layers 17c or 19c to 0.5 mg/cm$^2$ or less, the conductivity can be easily ensured.

The amount of the modified layer 17c or 19c disposed on the surface of the porous composite layers 17b and 19b per unit projected area can be measured by the following method. The description below uses the modified layer 17c as an example for explanation. The description applies to the modified layer 19c.

First, the weights of the entire anode diffusion layer 17 before and after the formation of the modified layer 17c are measured, and from a difference of these weights, a weight of the modified layer 17c is determined. Then, the weight of the modified layer 17c is divided by an area of the porous composite layer 17b, to give an amount of the modified layer 17c disposed on the surface of the porous composite layer 17b per unit projected area. In the case where the modified layer 17c is distributed like islands, the surface of the porous composite layer 17b partially includes a region where no modified layer 17c is formed. However, in this case also, the amount of the modified layer 17c can be determined in the manner as described above.

Figure 3:
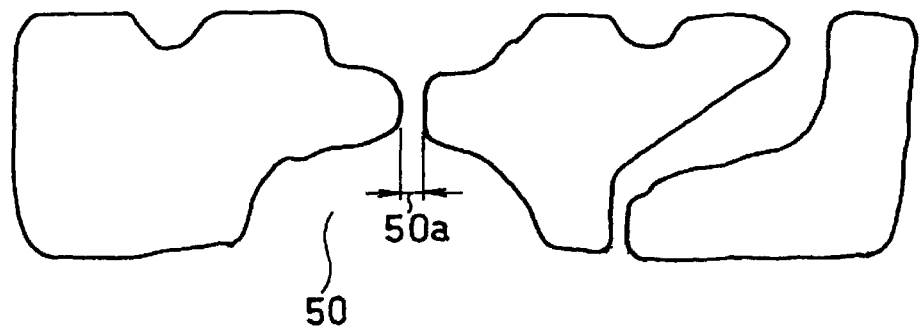
FIG. 3 An explanatory view schematically showing through pores of the anode or cathode diffusion layer.

The anode and cathode diffusion layers preferably have a plurality of through pores as shown in FIG. 3. Each through pore preferably has a throat portion where the pore becomes constricted and smallest in diameter. The throat portions may be formed by various methods, for example, by controlling the composition of the dispersion medium, the dispersing conditions, the drying conditions, or the like of a paste for porous composite layer prepared in the process of forming the porous composite layer. The diameters of throat portions 50a have a great influence on the permeability of fuel. The degree of distribution of the diameters of the throat portions can be determined from pore throat size distribution as measured by a half-dry/bubble-point method (ASTM E1294-89 and F316-86) using a permporometer. The "pore throat size" as used herein refers to the diameter of a circle having the same area as the smallest cross section of the through pore (a cross section of the throat portion).

The anode and cathode diffusion layers each preferably have a plurality of through pores having a largest pore diameter of 15 to 20 μm, and a mean flow pore diameter of 3 to 10 μm in pore throat size distribution as measured by a half-dry/bubble-point method.

As for the anode, carbon dioxide which is a reaction product is considered to selectively permeate through through pores having a largest pore diameter or a diameter close thereto, showing a behavior of viscous flow, while liquid fuel such as methanol is considered to permeate through the other through pores except the above, showing a behavior of diffusion flow. In short, the largest pore diameter relates to the discharge of carbon dioxide, while the mean flow pore diameter relates to the diffusibility of liquid fuel. As such, by providing the anode diffusion layer with the modified layer, and controlling the pore throat size distribution of the through pores, the fuel diffusibility can be readily improved effectively.

As for the cathode, liquid such as water is considered to selectively permeate through through pores having a largest pore diameter or a diameter close thereto, showing a behavior of viscous flow, while gas such as oxidant gas is considered to permeate through the other through pores except the above, showing a behavior of diffusion flow. The largest pore diameter relates to the water dischargeability. The mean flow pore diameter relates to the diffusibility of oxidant gas. As such, by providing the cathode diffusion layer with the modified layer, and controlling the pore throat size distribution of the through pores, the water dischargeability and the oxidant gas diffusibility can be readily improved effectively. Particularly, the mean flow pore diameter relates also to the formation of a three-phase boundary, which is an electrode reaction site, formed when oxidant gas is supplied from the cathode diffusion layer to the cathode catalyst layer.

It should be noted that the amount of the modified layer according to the present invention is very small, and therefore, even though the modified layer is provided in the anode and cathode diffusion layers, this has little influence on pore throat size distribution of the anode and cathode diffusion layers.

In pore throat size distribution, when the largest pore diameter in the anode diffusion layer is 15 μm or more, the ability to discharge carbon dioxide is further improved. When the largest pore diameter is 20 μm or less, the fuel flow is unlikely to increase locally around the fuel inlet, and the fuel is readily supplied to the anode catalyst layer more uniformly. On the other hand, when the largest pore diameter in the cathode diffusion layer is 15 μm or more, the function of the cathode diffusion layer to discharge water is further improved. When the largest pore diameter is 20 μm or less, the drying of the polymer electrolyte in the cathode catalyst layer is readily suppressed. As a result, the proton conductivity of the cathode catalyst layer is further improved.

Further, in pore throat size distribution, when the mean flow pore diameter in the anode diffusion layer is 3 μm or more, the fuel diffusibility is improved, and the fuel is readily supplied to the anode catalyst layer uniformly. When the mean flow pore diameter is 10 μm or less, the fuel flow is unlikely to increase locally around the fuel inlet, and the diffusibility of fuel into the anode catalyst layer and the uniformity of fuel therein can be obtained in a balanced manner. On the other hand, when the mean flow pore diameter in the cathode diffusion layer is 3 μm or more, the oxidant is readily supplied to the cathode catalyst layer uniformly. When the mean flow pore diameter is 10 μm or less, the polymer electrolyte contained in cathode catalyst layer around the oxidant inlet is unlikely to become dry. As a result, the proton conductivity of the cathode catalyst layer is further improved.

The largest pore diameter and the mean flow pore diameter can be measured using an automated pore size distribution measurement system for porous materials (hereinafter referred to as a "permporometer").

(i) Largest Pore Diameter

The largest pore diameter can be measured as follows.

First, the anode or cathode diffusion layer is punched out into a predetermined size to obtain a measurement sample. The measurement sample is immersed in Galwick reagent having a low surface tension, to impregnate the measurement sample with the Galwick reagent for 20 minutes in a reduced pressure environment, so that the through pores of the measurement sample are filled with the Galwick reagent.

Figure 5:
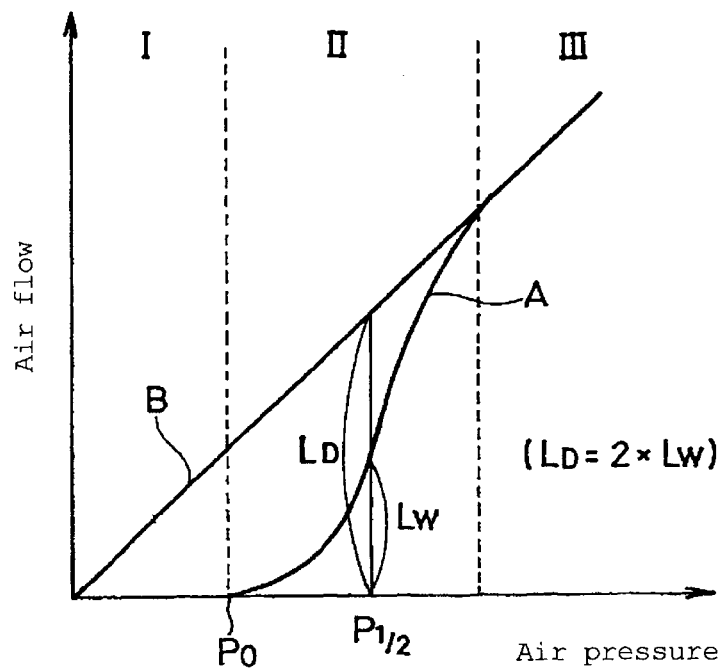
FIG. 5 A graph for explaining the principle of measurement of pore throat size distribution using a permporometer.

The measurement sample impregnated with the Galwick reagent is then mounted in a permporometer. Air is supplied to the measurement sample, and the air pressure is increased continuously. At this time, the pressure (bubble point pressure) $P_0$ at the moment when the air flow starts increasing from zero, shown in FIG. 5, is measured.

The measurement sample impregnated with the Galwick reagent is then mounted in a permporometer. Using the measured $P_0$ value, the largest pore diameter $D_0$ of the through pores of the anode or cathode diffusion layer can be calculated from the following equation (1):

$$D_0 = (C \times \gamma)/P_0 \qquad (1).$$

In the equation (1), $\gamma$ represents a surface tension of the Galwick reagent, and C represents a proportionality constant (2.86).

(ii) Mean Flow Pore Diameter

The mean flow pore diameter can be measured as follows.

In the same manner as described above, first, the anode or cathode diffusion layer is punched out into a predetermined size to obtain a measurement sample. The measurement sample is immersed in Galwick reagent having a low surface tension to impregnate the measurement sample with the Galwick reagent for 20 minutes in a reduced pressure environment, so that the through pores of the measurement sample are filled with the Galwick reagent.

Figure 4:
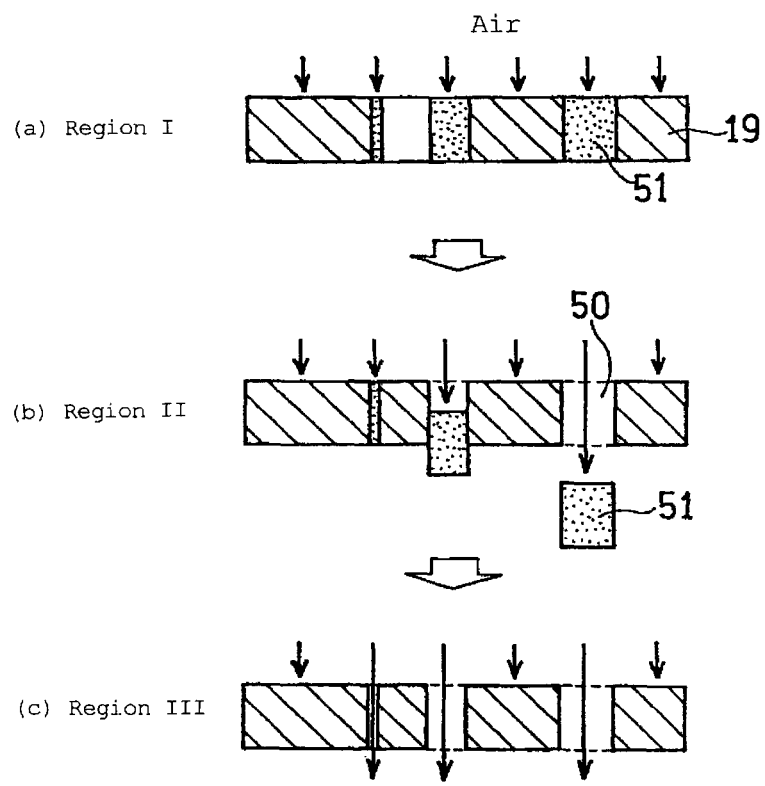
FIG. 4 A series of schematic diagrams for explaining the principle of measurement of pore throat size distribution using a permporometer.

The measurement sample is then mounted in a permporometer, and air is supplied to the measurement sample. As illustrated in FIG. 4(*a*), Galwick reagent 51 is not pushed out of the through pores 50 before the air pressure reaches $P_0$ (Region I). As illustrated in FIG. 4(*b*), when the air pressure reaches $P_0$ or more, the Galwick reagent 51 is pushed out of the through pores 50, and the air flow increases. At this time, the Galwick reagent is pushed out sequentially from the through pores in decreasing order of the pore diameter (Region II). As illustrated in FIG. 4(*c*), as the air pressure is further increased, the Galwick reagent 51 is pushed out of all the through pores 50 (Region III). A wet flow curve A shown in FIG. 5 is thus obtained. In this measurement, the air supply pressure is increased until the air flow reaches 200 L/min.

Next, using the same measurement sample continuously, the air flow is measured while the air pressure is increased continuously. In this measurement also, the air pressure is increased until the air flow reaches 200 L/min. A dry flow curve B shown in FIG. 5 is thus obtained.

Figure 6:
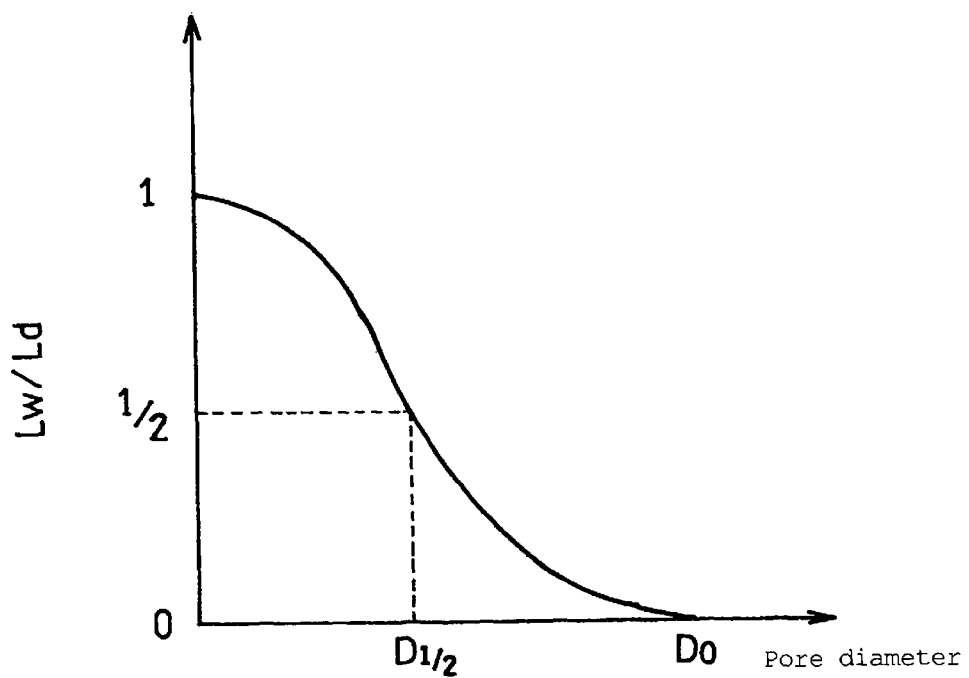
FIG. 6 Another graph for explaining the principle of measurement of pore throat size distribution using a permporometer.

With respect to the wet flow curve A shown in FIG. 5, the air pressure P is converted to the pore diameter D from the equation (1) above, and Lw/Ld is plotted against the pore diameter D to obtain a graph as shown in FIG. 6. Lw/Ld is an integrated value of the ratio of the wet flow to the dry flow measured for a predetermined pore diameter D. In the graph shown in FIG. 6, the pore size giving Lw/Ld of ½ is the mean flow pore diameter $D_{1/2}$ in pore throat size distribution. The pore size giving Lw/Ld of 0 is the largest pore diameter $D_0$ in a pore throat size distribution. The mean flow pore diameter $D_{1/2}$ determined in this manner means that the air flow through the through pores with diameters of $D_{1/2}$ or more is equal to ½ of the total air flow through the anode or cathode diffusion layer. Conversion of the graph of FIG. 6 showing the integrated values to a graph showing the degree of contribution every pore diameter can yield, for example, a graph shown in FIG. 7.

In the anode diffusion layer, the fuel flow is affected by the throat portions in the through pores. Therefore, the largest pore diameter and the mean flow pore diameter determined by the abovementioned measurement methods reflect the diameters of the throat portions in the through pores. In either of the cases where liquid passes through through pores and where gas passes through through pores, the liquid or gas flow is affected by the throat portions in the through pores. Accordingly, in the cathode diffusion layer also, the largest pore diameter and the mean flow pore diameter determined by the abovementioned measurement methods reflect the diameters of the throat portions in the through pores.

The anode catalyst layer 16 includes catalyst metal fine particles and a polymer electrolyte. For example, the catalyst metal fine particles may be Pt—Ru fine particles. The catalyst metal fine particles may be used alone or supported on a carrier. In the latter case, the weight ratio of the catalyst metal fine particles to the total of the catalyst metal fine particles and the carrier is preferably 40 to 80 wt %. An exemplary carrier is a conductive carbon material such as carbon black. The amount of the catalyst metal fine particles included in the anode catalyst layer 16 per unit projected area is preferably 3 to 7 $mg/cm^2$.

The cathode catalyst layer 18 includes catalyst metal fine particles and a polymer electrolyte. For example, the catalyst metal fine particles may be fine particles of Pt or Pt—Co alloy. The catalyst metal fine particles may be used alone or supported on a carrier. In the latter case, the weight ratio of the catalyst metal fine particles to the total of the catalyst metal fine particles and the carrier is preferably 40 to 80 wt %. An exemplary carrier is a conductive carbon material such as carbon black, which is highly electron conductive and highly resistant to acid. The amount of the catalyst metal fine particles included in the cathode catalyst layer per unit projected area is preferably 1 to 2 $mg/cm^2$.

The "amount of the catalyst metal fine particles included in each catalyst layer per unit projected area" as used herein is a value obtained by dividing the weight of the catalyst metal fine particles included in each catalyst layer by the area calculated from a profile of the catalyst layer viewed in a direction normal to the principal surface thereof. For example, when the profile of the catalyst layer viewed in the normal direction is rectangular, the area of the catalyst layer can be calculated as (longitudinal length)×(lateral length), and the amount of the catalyst metal fine particles per unit projected area is obtained by dividing the weight of the catalyst metal fine particles included in the catalyst layer by the above area.

The average particle diameter D50 of the catalyst metal fine particles is preferably, for example, 2 to 3 nm, and the average particle diameter D50 of the carrier is preferably, for example, 20 to 40 nm.

The polymer electrolyte included in the anode catalyst layer 16 and the cathode catalyst layer 18 is preferably excellent in proton conductivity, heat resistance, and chemical stability. Specifically, the polymer electrolyte is preferably a polymer having a perfluoroalkyl group with a sulfonic acid group at its terminal (perfluorosulfonic acid-based polymer) material, a sulfonated hydrocarbon-based polymer material, or the like. Examples of the perfluorosulfonic acid-based polymer material include Nafion (registered trademark) and Flemion (registered trademark). Particularly preferred is Nafion because the glass transition temperature Tg thereof is comparatively low, and is easily fluidized when subjected to hot pressing, which allows easy achievement of the anchor effect with the needle-like second water-repellent resin material. Examples of the sulfonated hydrocarbon-based polymer material include sulfonated polyether ether ketone and sulfonated polyimide. The weight ratio of the polymer electrolyte in the entire catalyst layer is preferably 15 to 35 wt %, and more preferably 18 to 30 wt %. The polymer electrolyte in the anode catalyst layer 16 may be the same as or different from the polymer electrolyte in the cathode catalyst layer 18.

The electrolyte membrane 10 is a sheet-like polymer electrolyte, and is preferably excellent in proton conductivity, heat resistance, and chemical stability. Specifically, the polymer electrolyte is preferably a perfluorosulfonic acid-based polymer material, a sulfonated hydrocarbon-based polymer material or the like. Particularly preferred is a sulfonated hydrocarbon-based polymer material because the formation of clustered sulfonic acid groups can be suppressed, and the permeation of methanol through the electrolyte membrane can be reduced. As a result, methanol crossover (MCO), a phenomenon in which unreacted methanol passes through the electrolyte membrane to reach the cathode, can be suppressed. The thickness of the electrolyte membrane is preferably 20 to 150 μm.

As long as the anode-side separator 14 and the cathode-side separator 15 have airtightness, electron conductivity, and electrochemical stability, no particular limitation is imposed on the material thereof. No particular limitation is imposed also on the shapes of the flow channels 20 and 21.

The anode-side separator has on its surface in contact with the anode diffusion layer, a fuel flow channel for supplying a fuel to the anode. The fuel flow channel is, for example, a recess or groove which is formed on the above contact surface and is open to the anode catalyst layer. The fuel flow channel communicates with the fuel inlet and outlet of the fuel cell main body.

The cathode-side separator has on its surface in contact with the cathode diffusion layer, an oxidant flow channel for supplying an oxidant (air) to the cathode. The oxidant flow channel is also, for example, a recess or groove which is formed on the above contact surface and is open to the cathode catalyst layer. The oxidant flow channel communicates with the oxidant inlet and outlet of the fuel cell main body.

The anode-side and cathode-side separators may be formed as one unit with a fuel flow channel on one side thereof and an oxidant flow channel on the other side thereof, or may be formed separately.

The fuel flow channel and the oxidant flow channel may be of any shape without particular limitation, and may be, for example, a serpentine channel or a parallel channel.

The current collector plates 24 and 25, the sheet heaters 26 and 27, the insulator plates 28 and 29, and the end plates 30 and 31 may be those known in the art.

The fuel is preferably methanol, and is preferably used in the form of an aqueous methanol solution having a concentration of 1 to 6 mol/L, and preferably 2 to 4 mol/L. A higher concentration of fuel can lead to a reduction in size and weight of the fuel cell as a whole, but may result in an increase in MCO. By setting the methanol concentration to 2 mol/L or more, the size and weight of the fuel cell can be readily reduced. By setting the methanol concentration to 4 mol/L or less, the MCO can be sufficiently reduced.

The membrane electrode assembly according to the present invention can be produced, for example, by the following method.

(i) Formation of Catalyst Layer

Catalyst metal fine particles, a polymer electrolyte, and a dispersion medium are mixed to prepare a paste for catalyst layer. The dispersion medium may be water or alcohol. The catalyst metal fine particles may be used alone or supported on a conductive carbon material or the like. In the paste for catalyst layer, the weight ratio of the polymer electrolyte to the total solids content is preferably 15 to 35 wt %. The resultant paste for catalyst layer is applied onto a surface of the electrolyte membrane using, for example, a doctor blade or a spray-type coater, and then dried, whereby a catalyst layer is obtained. Alternatively, the paste for catalyst layer may be applied onto, for example, a PTFE sheet to form a catalyst layer, and then the resultant catalyst layer may be transferred onto the electrolyte membrane.

By forming an anode catalyst layer on one surface of the electrolyte membrane, and a cathode catalyst layer on the other surface of the electrolyte membrane, a catalyst coated membrane (CCM) is obtained. The anode catalyst layer and the cathode catalyst layer can be formed in the similar manner.

(ii) Formation of Porous Composite Layer on Conductive Porous Substrate

A first water-repellent resin material or a raw material thereof, a conductive carbon material, and a dispersion medium are mixed to prepare a paste for porous composite layer. As for the first water-repellent resin material or the raw material thereof, the weight average molecular weight or the like is selected appropriately, so that the material will not become needle-like in the process of forming a porous composite layer. In the paste for porous composite layer, the weight ratio of the first water-repellent resin material or the raw material thereof to the total solids content is preferably 20 to 50 wt %. Subsequently, the resultant paste for porous composite layer is applied over one surface of the conductive porous substrate using, for example, a doctor blade or a spray-type coater, dried, and then baked at 350 to 370° C., whereby a porous composite layer is obtained. The porous composite layer on the conductive porous substrate for the anode and that for the cathode can be formed in the same manner.

(iii) Formation of Modified Layer

A second water-repellent resin material or a raw material thereof, and water serving as a dispersion medium are mixed to prepare a dispersion. The particles of the raw material of the second water-repellent resin material may be of any shape without limitation, and may be, for example, spherical or flaky particles. The diffusion layer is floated on the resultant dispersion, with the surface of the porous composite layer being contacted with the dispersion, thereby to allow the second water-repellent resin material or the raw material thereof to adhere to the porous composite layer. The length of time of floating on the dispersion is preferably set to 2 to 5 minutes. The weight ratio of the second water-repellent resin material or the raw material thereof in the dispersion is preferably 5 to 20 wt %. This makes it possible to allow an appropriate amount of the second water-repellent resin material or the raw material thereof to adhere to the porous composite layer. Subsequent baking of the diffusion layer at 350° C. to 370° C. forms a modified layer on the porous composite layer. During this baking, the raw material of the second water-repellent resin material included in the dispersion may be polymerized into a needle-like second water-repellent resin material. Alternatively, during this baking, the second water-repellent resin material may be formed into aggregates distributed like islands. The method of forming a modified layer is not limited to the method as described above, and a second water-repellent resin material having formed in a needle-like shape beforehand may be used.

The anode diffusion layer and the cathode diffusion layer can be formed in the same manner.

(iv) Fabrication of MEA

The anode diffusion layer and the cathode diffused layer are each cut into a predetermined size. The diffusion layers are stacked on both sides of the CCM. At this time, these are arranged such that the modified layer in the anode diffusion layer faces the anode catalyst layer, and the modified layer in the cathode diffusion layer faces the cathode catalyst layer. These stacked layers are bonded together by a hot pressing process, whereby a membrane-electrode assembly (MEA) is obtained. The hot pressing may be performed, for example, at 120 to 140° C. at 3 to 5 MPa.

EXAMPLES

Example 1

Fuel cells A to G and Comparative cells 1 to 2 were fabricated as follows.

<Preparation of Anode Catalyst Layer>

Pt-Ru fine particles with an average particle diameter D50 of 3 nm (Pt:Ru weight ratio=2:1) were used as catalyst metal fine particles for the anode. The Pt—Ru fine particles were ultrasonically dispersed in an aqueous isopropanol solution. The resultant dispersion and an aqueous solution containing 5 wt % of a polymer electrolyte were mixed and stirred, to give a paste for anode catalyst layer. The polymer electrolyte used here was a perfluorocarbon sulfonic acid-based polymer material (Nafion available from Sigma-Aldrich Co., LLC.). The weight ratio of the Pt—Ru fine particles to the polymer electrolyte in the paste for anode catalyst layer was set to 3:1.

Subsequently, the paste for anode catalyst layer was applied onto one principal surface of an electrolyte membrane 10 using a spray-type coater. The coating was dried to form an anode catalyst layer 16 of 6 cm×6 cm in size. The amount of the Pt—Ru fine particles contained in the anode catalyst layer 16 was 6.25 mg/cm$^2$.

The electrolyte membrane 10 used here was a sheet-like sulfonated hydrocarbon-based polymer material (Z1-APL, available from Polyfuel Inc., membrane thickness 62 μm) cut in a size of 15 cm×10 cm.

<Preparation of Cathode Catalyst Layer>

Pt fine particles with an average particle diameter D50 of 3 nm were used as catalyst metal fine particles for the cathode. The Pt fine particles were supported on a conductive carbon material, to give a cathode catalyst. The conductive carbon material used here was carbon black (Ketjen black EC, available from Mitsubishi Chemical Corporation, average particle diameter D50 of primary particles: 30 nm). The weight ratio of the Pt particles to the total of the Pt fine particles and the conductive carbon material was set to 46 wt %.

The cathode catalyst was ultrasonically dispersed in an aqueous isopropanol solution. The resultant dispersion and an aqueous solution containing 5 wt % of a polymer electrolyte were mixed and stirred, to give a paste for cathode catalyst layer. The polymer electrolyte used here was a perfluorocarbon sulfonic acid-based polymer material (Nafion available from Sigma-Aldrich Co., LLC.). The weight ratio of the Pt fine particles to the polymer electrolyte in the paste for cathode catalyst layer was set to 2:1.

Subsequently, the paste for cathode catalyst layer was applied onto the other principal surface of the electrolyte membrane 10 using a spray-type coater similar to that used for formation of an anode catalyst layer. The coating was dried to form a cathode catalyst layer 18 of 6 cm×6 cm in size. In such a manner, a catalyst coated membrane (CCM) was prepared. The amount of the Pt fine particles contained in the cathode catalyst layer 18 was 1.35 mg/cm$^2$.

<Preparation of Anode Diffusion Layer>

A water repellent material was allowed to adhere to a carbon paper (TGP-H-090, available from Toray Industries Inc.) serving as a conductive porous substrate, in the following manner.

The carbon paper was immersed for 1 minute in a PTFE dispersion (an aqueous solution prepared by diluting D-1E available from Daikin Industries, Ltd. with ion-exchange water, solids concentration: 7 wt %), and then dried at room temperature in the air for 3 hours. Thereafter, the carbon paper was heated at 360° C. in an inert gas ($N_2$) for 1 hour to remove the surfactant. The amount of PTFE in the conductive porous substrate was 12.5 wt %.

Thereafter, a porous composite layer 17b was formed on a surface of the conductive porous substrate 17a with a water repellent material adhering thereto.

First, carbon black (Vulcan XC-72R available from CABOT Corporation) serving as a conductive carbon material was ultrasonically dispersed in an aqueous isopropanol solution containing a surfactant (Triton X-100 available from Sigma-Aldrich Co., LLC.). To the resultant dispersion, a PTFE dispersion (KD 500AS available from Kitamura Limited, solids concentration: 20 wt %, endothermic peak temperature as measured by differential scanning calorimetry (DSC): 331.3° C.) serving as a raw material of a first water-repellent resin material was added, and stirred for 3 hours with a disper, to give a paste for anode porous composite layer (a first dispersion, water content in dispersion medium: 40 wt %). The weight ratio of the first water-repellent resin material to the total solids content including the surfactant was set to 26 wt %. The paste for anode porous composite layer was applied onto one surface of the conductive porous substrate using a doctor blade, and dried at room temperature in the air for 8 hours. The conductive porous substrate was then baked at 360° C. in an inert gas ($N_2$) for 1 hour to remove the surfactant, whereby the porous composite layer 17b was formed on the surface of the conductive porous substrate 17a. Observation under a scanning electron microscope showed that the porous composite layer 17b included flaky particles of the first water-repellent resin material. Observation of randomly selected 10 flaky particles showed that the maximum diameter of the basal surface was 1 to 1.5 μm, and the diameter perpendicular to the maximum diameter of the basal surface was 0.5 to 1 μm. The maximum thickness of the flaky particle was 0.2 μm. The amount of the first water-repellent resin material (PTFE) contained in the porous composite layer was 40 wt %. The amount of the porous composite layer laminated on the surface of the conductive porous substrate per unit projected area was 2.6 mg/cm$^2$. The thickness of the conductive porous substrate 17a was 300 μm, and the thickness of the porous composite layer 17b was 25 μm.

The diffusion layer was floated on a dispersion of a raw material of a second water-repellent resin material containing 95 wt % tetrafluoroethylene (TFE) unit (a second dispersion, solids concentration: 5 wt %, endothermic peak temperature as measured by differential scanning calorimetry (DSC): 334.4° C.) for 2 minutes, with the surface of the porous composite layer being contacted with the dispersion, thereby to allow the raw material of a second water-repellent resin material to adhere to the porous composite layer. This is followed by baking at 360° C. for 20 minutes in the air, to form a modified layer 17c on the surface of the porous composite layer 17b. Observation under a scanning electron microscope showed that the modified layer 17c included aggregates of a needle-like second water-repellent resin material, and the aggregates of a second water-repellent resin material were distributed like islands on the surface of the porous composite layer 17b. The amount of the modified layer disposed on the surface of the porous composite layer per unit projected area was 0.02 mg/cm². Measurement with a scanning electron microscope showed that the average length in the major axis direction of the second water-repellent resin material was 1 μm, and the average length in the minor axis direction thereof was 0.05 μm.

<Preparation of Cathode Diffusion Layer>

A water repellent material was allowed to adhere to a carbon paper (TGP-H-060, available from Toray Industries Inc.) serving as a conductive porous substrate, in the following manner.

The carbon paper was immersed for 1 minute in a PTFE dispersion (an aqueous solution prepared by diluting a 60% PTFE dispersion available from Sigma-Aldrich Co., LLC. with ion-exchange water, solids concentration: 15 wt %), and then dried at room temperature in the air for 3 hours. Thereafter, the carbon paper was heated at 360° C. in an inert gas ($N_2$) for 1 hour to remove the surfactant. The amount of PTFE in the conductive porous substrate was 23.5 wt %.

Thereafter, a porous composite layer 19b was formed on a surface of the conductive porous substrate 19a with a water repellent material adhering thereto.

First, carbon black (Vulcan XC-72R available from CABOT Corporation) serving as a conductive carbon material was ultrasonically dispersed in an aqueous isopropanol solution containing a surfactant (Triton X-100 available from Sigma-Aldrich Co., LLC.). To the resultant dispersion, a PTFE dispersion (KD 500AS available from Kitamura Limited, solids concentration: 20 wt %, endothermic peak temperature as measured by differential scanning calorimetry (DSC): 331.3° C.) serving as a raw material of a first water-repellent resin material was added, and stirred for 3 hours with a disper, to give a paste for cathode porous composite layer (a first dispersion, water content in dispersion medium: 40 wt %). The paste for cathode porous composite layer was applied onto one surface of the conductive porous substrate using a doctor blade, and dried at room temperature in the air for 8 hours. The conductive porous substrate was then baked at 360° C. in an inert gas ($N_2$) for 1 hour to remove the surfactant, whereby the porous composite layer 19b was formed on the surface of the conductive porous substrate 19a. Observation under a scanning electron microscope showed that the porous composite layer 19b included flaky particles of the first water-repellent resin material. Observation of randomly selected 10 flaky particles showed that the maximum diameter of the basal surface was 1 to 1.5 μm, and the diameter perpendicular to the maximum diameter of the basal surface was 0.5 to 1 μm. The maximum thickness of the flaky particle was 0.2 μm. The amount of the first water-repellent resin material (PTFE) contained in the porous composite layer was 40 wt %. The amount of the porous composite layer laminated on the surface of the conductive porous substrate per unit projected area was 1.8 mg/cm². The thickness of the conductive porous substrate 19a was 200 μm, and the thickness of the porous composite layer 19b was 18 μm.

<Fabrication of MEA>

First, each of the anode and cathode diffusion layers 17 and 19 fabricated in the above was cut in a size of 6 cm×6 cm, and they were stacked on both sides of the catalyst coated membrane (CCM), such that the porous composite layers were brought into contact with the catalyst layers. The resultant stack was then subjected to a hot pressing process (at 130° C. and 4 MPa for 3 minutes), to bond the catalyst layers to the diffusion layers, whereby a membrane electrode assembly (MEA) 13 was fabricated.

Subsequently, an anode-side gasket 22 and a cathode-side gasket 23 were disposed around the anode 11 and the cathode 12 of the MEA so as to sandwich the electrolyte membrane 10. The anode-side and cathode-side gaskets 22 and 23 used here were a three-layer structure including a polyetherimide layer as an intermediate layer and silicone rubber layers disposed on both sides thereof.

The MEA 13 fitted with the gaskets were sandwiched between an anode-side and cathode side separators 14 and 15, current collector plates 24 and 25, sheet heaters 26 and 27, insulator plates 28 and 29, and end plates 30 and 31, each of which had outer dimensions of 12 cm×12 cm, and these were secured by clamping rods. The clamping pressure was set to 12 kgf per unit area of the separators.

The anode-side and cathode-side separators 14 and 15 used here were a resin-impregnated graphite material of 4 mm in thickness (G347B available from TOKAI CARBON CO., LTD.). A serpentine flow channel having a width of 1.5 mm and a depth of 1 mm had been formed on each separator beforehand. The current collector plates 24 and 25 used were a gold-plated stainless steel plate. The sheet heaters 26 and 27 used here were SAMICON HEATER (available from SAKAGUCHI E.H. VOC CORP.). A fuel cell (Cell A) was produced in the manner as described above.

Example 2

Cell B was produced in the same manner as in Example 1, except that in the preparation of a modified layer for the anode diffusion layer, the solids concentration of the second dispersion was set to 4 wt %. The amount of the modified layer disposed on the surface of the porous composite layer per projected unit area was 0.01 mg/cm². Measurement with a scanning electron microscope showed that the average length in the major axis direction of the second water-repellent resin material was 0.9 μm, and the average length in the minor axis direction thereof was 0.05 μm.

Example 3

Cell C was produced in the same manner as in Example 1, except that in the preparation of a modified layer for the anode diffusion layer, the solids concentration of the second dispersion was set to 20 wt %. The amount of the modified layer disposed on the surface of the porous composite layer per projected unit area was 0.48 mg/cm². Measurement with a scanning electron microscope showed that the average length in the major axis direction of the second water-repellent resin material was 1.5 μm, and the average length in the minor axis direction thereof was 0.08 μm.

Example 4

Cell D was produced in the same manner as in Example 1, except that in the preparation of a modified layer for the anode diffusion layer, the solids concentration of the second dispersion was set to 3 wt %. The amount of the modified layer disposed on the surface of the porous composite layer per projected unit area was 0.005 mg/cm². Measurement with a scanning electron microscope showed that the average length in the major axis direction of the second water-repellent resin material was 0.8 μm, and the average length in the minor axis direction thereof was 0.05 μm.

Example 5

Cell E was produced in the same manner as in Example 1, except that in the preparation of a modified layer for the anode diffusion layer, the solids concentration of the second dispersion was set to 21 wt %. The amount of the modified layer disposed on the surface of the porous composite layer per projected unit area was 0.55 mg/cm$^2$. Measurement with a scanning electron microscope showed that the average length in the major axis direction of the second water-repellent resin material was 2 μm, and the average length in the minor axis direction thereof was 0.1 μm.

Example 6

Cell F was produced in the same manner as in Example 1, except that in the preparation of a modified layer for the anode diffusion layer, the solids concentration of the second dispersion was set to 22 wt %. The amount of the modified layer disposed on the surface of the porous composite layer per projected unit area was 0.63 mg/cm$^2$. Measurement with a scanning electron microscope showed that the average length in the major axis direction of the second water-repellent resin material was 2.5 μm, and the average length in the minor axis direction thereof was 0.1 μm.

Example 7

In the preparation of a porous composite layer for the anode diffusion layer, a 60 wt % PTFE dispersion (available from Sigma-Aldrich Co., LLC.) was used as a dispersion of PTFE being the first water-repellent resin material, to prepare a paste for anode porous composite layer (water content in dispersion medium: 80 wt %). Cell G was produced in the same manner as in Example 1, except that the paste for anode porous composite layer thus prepared was used. The amount of the first water-repellent resin material contained in the porous composite layer was 40 wt %. The amount of the porous composite layer laminated on the conductive porous substrate per projected unit area was 1.8 mg/cm$^2$. Observation under a scanning electron microscope showed that the porous composite layer included a needle-like first water-repellent resin material.

Comparative Example 1

Comparative cell 1 was produced in the same manner as in Example 1, except that no modified layer was formed in the anode diffusion layer.

Comparative Example 2

Comparative cell 2 was produced in the same manner as in Example 1, except that KD 500AS available from Kitamura Limited (solids concentration: 20 wt %, endothermic peak temperature as measured by differential scanning calorimetry (DSC): 331.3° C.) was used as a dispersion for forming a modified layer for the anode dispersion layer. Observation of the modified layer under a scanning electron microscope showed that flake-like water-repellent resin material was present in the modified layer but no needle-like water-repellent resin material was present.

The configurations of Cells A to G and Comparative cells 1 and 2 are shown in Tables 1 and 2.

TABLE 1

|  | Amount of anode-side porous composite layer (mg/cm$^2$) | Amount of cathode-side porous composite layer (mg/cm$^2$) | Shape of first water-repellent resin material (anode diffusion layer) |
| --- | --- | --- | --- |
| Cell A | 2.6 | 1.8 | Flake-like |
| Cell B | 2.6 | 1.8 | Flake-like |
| Cell C | 2.6 | 1.8 | Flake-like |
| Cell D | 2.6 | 1.8 | Flake-like |
| Cell E | 2.6 | 1.8 | Flake-like |
| Cell F | 2.6 | 1.8 | Flake-like |
| Cell G | 2.6 | 1.8 | Needle-like |
| Com. Cell 1 | 2.6 | 1.8 | Flake-like |
| Com. Cell 2 | 2.6 | 1.8 | Flake-like |

TABLE 2

|  | Solids concentration of second dispersion (wt %) | Shape of second water-repellent resin material | Content of TFE unit (wt %) | Length along major axis (μm) | Length along minor axis (μm) | Amount of modified layer (mg) | Distributed state of modified layer |
| --- | --- | --- | --- | --- | --- | --- | --- |
| Cell A | 5 | Needle-like | 95 | 1.0 | 0.05 | 0.02 | like islands |
| Cell B | 4 | Needle-like | 95 | 0.9 | 0.05 | 0.01 | like islands |
| Cell C | 20 | Needle-like | 95 | 1.5 | 0.08 | 0.48 | like islands |
| Cell D | 3 | Needle-like | 95 | 0.8 | 0.05 | 0.005 | like islands |
| Cell E | 21 | Needle-like | 95 | 2.0 | 0.1 | 0.55 | like islands |
| Cell F | 22 | Needle-like | 95 | 2.5 | 0.1 | 0.63 | like islands |
| Cell G | 5 | Needle-like | 95 | 1.0 | 0.05 | 0.02 | like islands |
| Com. Cell 1 | — | — | — | — | — | — | — |
| Com. Cell 2 | 20 | Flake-like | 95 | — | — | 0.02 | like islands |

Fuel cells H to O were produced in the following manner. The methods for forming the anode and cathode catalyst layers for Fuel cells H to O were the same as in Example 1, and the description thereof is omitted.

Example 8

Preparation of Cathode Diffusion Layer

A water repellent material was allowed to adhere to a carbon paper (TGP-H-060, available from Toray Industries Inc.) serving as a conductive porous substrate, in the following manner.

The carbon paper was immersed for 1 minute in a PTFE dispersion (an aqueous solution prepared by diluting a 60% PTFE dispersion available from Sigma-Aldrich Co., LLC. with ion-exchange water, solids concentration: 15 wt%), and then dried at room temperature in the air for 3 hours. Thereafter, the carbon paper was heated at 360° C. in an inert gas ($N_2$) for 1 hour to remove the surfactant. The amount of PTFE in the conductive porous substrate was 23.5 wt %.

Thereafter, a porous composite layer 19b was formed on a surface of the conductive porous substrate 19a with a water repellent material adhering thereto.

First, carbon black (Vulcan XC-72R available from CABOT Corporation) serving as a conductive carbon material was ultrasonically dispersed in an aqueous isopropanol solution containing a surfactant (Triton X-100 available from Sigma-Aldrich Co., LLC.). To the resultant dispersion, a PTFE dispersion (KD 500AS available from Kitamura Limited, solids concentration: 20 wt %, endothermic peak temperature as measured by differential scanning calorimetry (DSC): 331.3° C.) serving as a raw material of a first water-repellent resin material was added, and stirred for 3 hours with a disper, to give a paste for cathode porous composite layer (a first dispersion, water content in dispersion medium: 40 wt %). The weight ratio of the first water-repellent resin material (PTFE) to the total solids content including the surfactant was set to 26 wt %. The paste for cathode porous composite layer was applied onto one surface of the conductive porous substrate using a doctor blade, and dried at room temperature in the air for 8 hours. The conductive porous substrate was then baked at 360° C. in an inert gas ($N_2$) for 1 hour to remove the surfactant, whereby the porous composite layer 19b was formed on the surface of the conductive porous substrate 19a. Observation under a scanning electron microscope showed that the porous composite layer 19b included flaky particles of the first water-repellent resin material. Observation of randomly selected 10 flaky particles showed that the maximum diameter of the basal surface was 1 to 1.5 μm, and the diameter perpendicular to the maximum diameter of the basal surface was 0.5 to 1 μm. The maximum thickness of the flaky particle was 0.2 μm. The amount of the first water-repellent resin material (PTFE) contained in the porous composite layer 19b was 40 wt %. The amount of the porous composite layer 19b laminated on the surface of the conductive porous substrate 19a per unit projected area was 1.8 mg/cm². The thickness of the conductive porous substrate 19a was 200 μm, and the thickness of the porous composite layer 19b was 18 μm.

The diffusion layer was floated on a dispersion of a raw material of a second water-repellent resin material containing 95 wt % tetrafluoroethylene (TFE) unit (a second dispersion, solids concentration: 5 wt %, endothermic peak temperature as measured by differential scanning calorimetry (DSC): 334.4° C.) for 2 minutes, with the surface of the porous composite layer being contacted with the dispersion, thereby to allow the raw material of a second water-repellent resin material to adhere to the porous composite layer. This is followed by baking at 360° C. for 20 minutes in the air, to form a modified layer on the surface of the porous composite layer. Observation under a scanning electron microscope showed that the modified layer included aggregates of the needle-like second water-repellent resin material, and the aggregates of the second water-repellent resin material were distributed like islands on the surface of the porous composite layer. The amount of the modified layer disposed on the surface of the porous composite layer per unit projected area was 0.02 mg/cm². Measurement with a scanning electron microscope showed that the average length in the major axis direction of the second water-repellent resin material was 1 μm, and the average length in the minor axis direction thereof was 0.05 μm.

<Preparation of Anode Diffusion Layer>

A water repellent material was allowed to adhere to a carbon paper (TGP-H-090, available from Toray Industries Inc.) serving as a conductive porous substrate, in the following manner.

The carbon paper was immersed for 1 minute in a PTFE dispersion (an aqueous solution prepared by diluting D-1E available from Daikin Industries, Ltd. with ion-exchange water, solids concentration: 7 wt %), and then dried at room temperature in the air for 3 hours. Thereafter, the carbon paper was heated at 360° C. in an inert gas ($N_2$) for 1 hour to remove the surfactant. The amount of PTFE in the conductive porous substrate was 12.5 wt %.

Thereafter, a porous composite layer was formed on a surface of the conductive porous substrate with a water repellent material adhering thereto.

First, carbon black (Vulcan XC-72R available from CABOT Corporation) serving as a conductive carbon material was ultrasonically dispersed in an aqueous isopropanol solution containing a surfactant (Triton X-100 available from Sigma-Aldrich Co., LLC.). To the resultant dispersion, a PTFE dispersion (D-1E, available from Daikin Industries, Ltd.) was added, and stirred for 3 hours with a disper, to give a paste for anode porous composite layer. The weight ratio of PTFE to the total solids content including the surfactant was set to 26 wt %. The paste for anode porous composite layer was applied onto one surface of the conductive porous substrate using a doctor blade, and dried at room temperature in the air for 8 hours. The conductive porous substrate was then baked at 360° C. in an inert gas ($N_2$) for 1 hour to remove the surfactant, whereby a porous composite layer was formed on the surface of the conductive porous substrate. An anode diffusion layer was thus obtained.

In the anode diffusion layer, the amount of PTFE contained in the porous composite layer was 40 wt %. The amount of the porous composite layer laminated on the surface of the conductive porous substrate per unit projected area was 2.6 mg/cm². The thickness of the conductive porous substrate was 300 μm, and the thickness of the porous composite layer was 25 μm.

<Fabrication of MEA>

First, the anode diffusion layer and the cathode diffusion layer 19 were each cut in a size of 6 cm×6 cm, and then stacked on both sides of the catalyst coated membrane (CCM), such that the porous composite layers were brought into contact with the catalyst layers. The resultant stack was then subjected to a hot pressing process (at 130° C. and 4 MPa for 3 minutes), to bond the catalyst layers to the diffusion layers, whereby a membrane electrode assembly (MEA) 13 was fabricated.

Subsequently, an anode-side gasket 22 and a cathode-side gasket 23 were disposed around the anode and the cathode 12 of the MEA 13 so as to sandwich the electrolyte membrane 10. The anode-side and cathode-side gaskets 22 and 23 used here were a three-layer structure including a polyetherimide layer as an intermediate layer and silicone rubber layers disposed on both sides thereof.

The MEA 13 fitted with the gaskets were sandwiched between an anode-side and cathode side separators 14 and 15, current collector plates 24 and 25, sheet heaters 26 and 27, insulator plates 28 and 29, and end plates 30 and 31, each of which had outer dimensions of 12 cm×12 cm, and these were secured by clamping rods. The clamping pressure was set to 12 kgf per unit area of the separators.

The anode-side and cathode-side separators 14 and 15 used here were a resin-impregnated graphite material of 4 mm in thickness (G347B available from TOKAI CARBON CO., LTD.). A serpentine flow channel having a width of 1.5 mm and a depth of 1 mm had been formed on each separator beforehand. The current collector plates 24 and 25 used were a gold-plated stainless steel plate. The sheet heaters 26 and 27 used here were SAMICON HEATER (available from SAK-AGUCHI E.H. VOC CORP.). A fuel cell (Cell H) was produced in the manner as described above.

Example 9

Cell I was produced in the same manner as in Example 8, except that in the preparation of a modified layer for the cathode diffusion layer, the solids concentration of the second dispersion was set to 4 wt %. The amount of the modified layer disposed on the surface of the porous composite layer per projected unit area was 0.01 mg/cm². Measurement with a scanning electron microscope showed that the average length in the major axis direction of the second water-repellent resin material was 0.9 µm, and the average length in the minor axis direction thereof was 0.05 µm.

Example 10

Cell J was produced in the same manner as in Example 8, except that in the preparation of a modified layer for the cathode diffusion layer, the solids concentration of the second dispersion was set to 20 wt %. The amount of the modified layer disposed on the surface of the porous composite layer per projected unit area was 0.48 mg/cm². Measurement with a scanning electron microscope showed that the average length in the major axis direction of the second water-repellent resin material was 1.5 µm, and the average length in the minor axis direction thereof was 0.08 µm.

Example 11

Cell K was produced in the same manner as in Example 8, except that in the preparation of a modified layer for the cathode diffusion layer, the solids concentration of the second dispersion was set to 3 wt %. The amount of the modified layer disposed on the surface of the porous composite layer per projected unit area was 0.005 mg/cm². Measurement with a scanning electron microscope showed that the average length in the major axis direction of the second water-repellent resin material was 0.8 µm, and the average length in the minor axis direction thereof was 0.05 µm.

Example 12

Cell L was produced in the same manner as in Example 8, except that in the preparation of a modified layer for the cathode diffusion layer, the solids concentration of the second dispersion was set to 21 wt %. The amount of the modified layer disposed on the surface of the porous composite layer per projected unit area was 0.55 mg/cm². Measurement with a scanning electron microscope showed that the average length in the major axis direction of the second water-repellent resin material was 2 µm, and the average length in the minor axis direction thereof was 0.1 µm.

Example 13

Cell M was produced in the same manner as in Example 8, except that in the preparation of a modified layer for the cathode diffusion layer, the solids concentration of the second dispersion was set to 22 wt %. The amount of the modified layer disposed on the surface of the porous composite layer per projected unit area was 0.63 mg/cm². Measurement with a scanning electron microscope showed that the average length in the major axis direction of the second water-repellent resin material was 2.5 µm, and the average length in the minor axis direction thereof was 0.1 µm.

Example 14

In the preparation of a porous composite layer for the cathode diffusion layer, a 60 wt % PTFE dispersion (available from Sigma-Aldrich Co., LLC.) was used as a dispersion of PTFE being a first water-repellent resin material, to prepare a paste for cathode porous composite layer (water content in dispersion medium: 80 wt %). Cell N was produced in the same manner as in Example 8, except that the paste for cathode porous composite layer thus prepared was used. The amount of the first water-repellent resin material contained in the porous composite layer was 40 wt %. The amount of the porous composite layer laminated on the conductive porous substrate per projected unit area was 1.8 mg/cm². Observation under a scanning electron microscope showed that the porous composite layer included a needle-like first water-repellent resin material.

Example 15

Cell O was produced in the same manner as in Example 8, except that a modified layer was formed on the porous composite layer in the anode diffusion layer in the same manner as for the cathode diffusion layer. The amount of the modified layer disposed on the surface of the porous composite layer in the anode diffusion layer per projected unit area was 0.02 mg/cm². Measurement with a scanning electron microscope showed that the average length in the major axis direction of the second water-repellent resin material contained in the anode diffusion layer was 1.0 µm, and the average length in the minor axis direction thereof was 0.05 µm.

Comparative Example 3

Comparative cell 3 was produced in the same manner as in Example 8, except that no modified layer was formed in the cathode diffusion layer.

Comparative Example 4

Comparative cell 4 was produced in the same manner as in Example 8, except that KD 500AS available from Kitamura Limited (solids concentration: 20 wt %, endothermic peak temperature as measured by differential scanning calorimetry (DSC): 331.3° C.) was used as a dispersion for forming a modified layer for the cathode dispersion layer. Observation of the modified layer under a scanning electron microscope showed that a flake-like water-repellent resin material was present in the modified layer but no needle-like water-repellent resin material was present.

The configurations of Cells H to O and Comparative Cells 3 and 4 are shown in Tables 3 and 4.

TABLE 3

|  | Amount of cathode-side porous composite layer (mg/cm$^2$) | Amount of anode-side porous composite layer (mg/cm$^2$) | Shape of first water-repellent resin material (cathode diffusion layer) |
|---|---|---|---|
| Cell H | 1.8 | 2.6 | Flake-like |
| Cell I | 1.8 | 2.6 | Flake-like |
| Cell J | 1.8 | 2.6 | Flake-like |
| Cell K | 1.8 | 2.6 | Flake-like |
| Cell L | 1.8 | 2.6 | Flake-like |
| Cell M | 1.8 | 2.6 | Flake-like |
| Cell N | 1.8 | 2.6 | Needle-like |
| Cell O | 1.8 | 2.6 | Flake-like |
| Com. Cell 3 | 1.8 | 2.6 | Flake-like |
| Com. Cell 4 | 1.8 | 2.6 | Flake-like |

TABLE 4

|  | Solids concentration of second dispersion (wt %) | Shape of second water-repellent resin material | Content of TFE unit (wt %) | Length along major axis (μm) | Length along minor axis (μm) | Amount of modified layer (mg) | Distributed state of modified layer |
|---|---|---|---|---|---|---|---|
| Cell H | 5 | Needle-like | 95 | 1.0 | 0.05 | 0.02 | like islands |
| Cell I | 4 | Needle-like | 95 | 0.9 | 0.05 | 0.01 | like islands |
| Cell J | 20 | Needle-like | 95 | 1.5 | 0.08 | 0.48 | like islands |
| Cell K | 3 | Needle-like | 95 | 0.8 | 0.05 | 0.005 | like islands |
| Cell L | 21 | Needle-like | 95 | 2.0 | 0.1 | 0.55 | like islands |
| Cell M | 22 | Needle-like | 95 | 2.5 | 0.1 | 0.63 | like islands |
| Cell N | 5 | Needle-like | 95 | 1.0 | 0.05 | 0.02 | like islands |
| Cell O | 5 | Needle-like | 95 | 1.0 | 0.05 | 0.02 | like islands |
| Com. Cell 3 | — | — | — | — | — | — | — |
| Com. Cell 4 | 20 | Flake-like | 95 | — | — | 0.02 | like islands |

[Evaluation]

With respect to the anode and cathode diffusion layers used for forming the fuel cells of Examples 1 to 15 and Comparative Examples 1 to 4, the largest pore diameter and mean flow pore diameter of the through pores in pore throat size distribution were measured using an automated pore size distribution measurement system for porous materials (permporometer) available from Porous Materials, Inc. (PMI).

(1) Largest Pore Diameter of Through Pores

The anode and cathode diffusion layers were each punched out into a disc of 25 mm in diameter to obtain a measurement sample. The sample was immersed in Galwick reagent having a surface tension γ of 15.7 mN/m, to impregnate the sample with the Galwick reagent for 20 minutes in a reduced pressure environment. In this manner, the through pores of the sample were filled with the Galwick reagent.

Subsequently, the sample filled with the Galwick reagent was mounted in the permporometer. The air pressure was continuously increased, and the pressure (bubble point pressure) $P_0$ at the moment when the air flow starts increasing from zero was measured. Using the measured $P_0$ value, the largest pore diameter $D_0$ of the through pores was calculated from the equation (1):

$$D_0 = (C \times \gamma)/P_0 \qquad (1).$$

(2) Mean Flow Pore Diameter of Through Pores

The through pores of the measurement sample were filled with the Galwick reagent in the same manner as in measuring the largest pore diameter of the through pores. Thereafter, the measurement sample was mounted in the permporometer, and the air pressure was continuously increased until the air flow reached 200 L/min. A wet flow curve was thus obtained.

Next, using the same measurement sample continuously, the air flow was measured while the air pressure was increased continuously. In this measurement also, the air pressure was increased until the air flow reached 200 L/min. A dry flow curve was thus obtained.

From these curves, a pressure $P_{1/2}$ at which the air flow Lw in the wet flow curve was ½ of the air flow Ld in the dry flow curve was determined. Using the determined $P_{1/2}$ value, a mean flow pore diameter $D_{1/2}$ of the through pores of the diffusion layer was calculated from the above equation (1).

The measurement results of the largest pore diameter and mean flow pore diameter in pore throat size distribution of the through pores of the anode diffusion layer of Cells A to G and Comparative cells 1 and 2 are shown in Table 5. The measurement results of the largest pore diameter and mean flow pore diameter in pore throat size distribution of the through pores of the cathode diffusion layer of Cells H to O and Comparative cells 3 and 4 are shown in Table 6.

Next, with respect to Cells A to G and Comparative cell 1 and 2, the durability was evaluated in the following manner.

An aqueous 4 mol/L methanol solution was supplied as a fuel to the anode at a flow rate of 0.267 mL/min, while air was supplied as an oxidant to the cathode at a flow rate of 0.261 L/min. Each of the fuel cells was operated at a constant current of 200 mA/cm$^2$ to generate power continuously. The cell temperature during the power generation was set to 60° C.

From the value of voltage measured 4 hours after the start of power generation, a value of power density was determined, which was defined as an initial power density. The results are shown in Table 5.

Thereafter, a value of power density was determined from the value of voltage measured 5000 hours after the start of power generation. A ratio of the power density after 5000 hours to the initial power density was calculated as a power density retention rate (%). The results are shown in Table 5.

Further, with respect to Cells H to O and Comparative cell 3 and 4, the durability was evaluated in the following manner.

An aqueous 3 mol/L methanol solution was supplied as a fuel to the anode at a flow rate of 0.398 mL/min, while air was supplied as an oxidant to the cathode at a flow rate of 0.392 L/min. Each fuel cell was operated at a constant voltage of 0.4 V to generate power continuously. The cell temperature during the power generation was set to 65° C.

From the value of voltage measured 4 hours after the start of power generation, a value of power density was determined, which was defined as an initial power density. The results are shown in Table 6.

Thereafter, a value of power density was determined from the value of voltage measured 5000 hours after the start of power generation. A ratio of the power density after 5000 hours to the initial power density was calculated as a power density retention rate (%). The results are shown in Table 6.

TABLE 5

| | Largest pore diameter ($\mu m$) | Mean flow pore diameter ($\mu m$) | Initial power density ($mW/cm^2$) | Power density retention rate (%) |
|---|---|---|---|---|
| Cell A | 18 | 5 | 84 | 90 |
| Cell B | 18 | 5 | 82 | 88 |
| Cell C | 18 | 5 | 77 | 88 |
| Cell D | 18 | 5 | 75 | 82 |
| Cell E | 20 | 7 | 73 | 83 |
| Cell F | 20 | 8 | 72 | 82 |
| Cell G | 22 | 10 | 79 | 83 |
| Com. Cell 1 | 18 | 5 | 60 | 68 |
| Com. Cell 2 | 18 | 5 | 65 | 74 |

TABLE 6

| | Largest pore diameter ($\mu m$) | Mean flow pore diameter ($\mu m$) | Initial power density ($mW/cm^2$) | Power density retention rate (%) |
|---|---|---|---|---|
| Cell H | 18 | 5 | 93 | 94 |
| Cell I | 18 | 5 | 92 | 93 |
| Cell J | 18 | 5 | 86 | 92 |
| Cell K | 18 | 5 | 84 | 86 |
| Cell L | 20 | 7 | 82 | 87 |
| Cell M | 20 | 8 | 80 | 85 |
| Cell N | 22 | 10 | 86 | 87 |
| Cell O | 18 | 5 | 98 | 96 |
| Com. Cell 3 | 18 | 5 | 70 | 54 |
| Com. Cell 4 | 18 | 5 | 74 | 66 |

As shown in Tables 5 and 6, Cells A to O all exhibited a high power density retention rate. This is presumably because the modified layer containing a needle-like second water-repellent resin material was disposed between the porous composite layer included in at least one of the anode and cathode diffusion layers and the catalyst layer corresponding thereto, which improved the interface bonding strength therebetween.

In Cells A to G and O, it is considered that the anode catalyst layer and the porous composite layer were unlikely to be separated from each other, which suppressed an increase in internal resistance. Further, the anode catalyst layer and the porous composite layer were unlikely to have space therebetween. Because of this, the fuel diffused more uniformly in the anode catalyst layer, and as a result, a local increase in MCO and a reduction in power generation area were suppressed, which resulted in a very high power density retention rate.

In Cells H to O, it is considered that the cathode catalyst layer and the porous composite layer were unlikely to be separated from each other, which suppressed an increase in internal resistance. Further, the cathode catalyst layer and the porous composite layer were unlikely to have space therebetween. Because of this, accumulation of produced water was prevented, and thus the diffusibility of oxidant gas was not reduced. As a result, a very high power density retention rate was obtained.

Among these, Cells A to C, H to J, and O exhibited remarkably improvement in initial power density and power density retention rate. This indicates that a preferable amount of the modified layer disposed on the surface of the porous composite layer per unit projected area is 0.01 to 0.5 $mg/cm^2$. It is considered that because of the presence of an appropriate amount of the modified layer in these cells, the favorable uniform diffusibility of fuel in the anode porous composite layer was maintained without an increase in the interface contact resistance between the porous composite layer in the anode diffusion layer and the anode catalyst layer in Cells A to C and O. In Cells H to J and O, the favorable water repellency of the cathode porous composite layer was maintained without an increase in the interface contact resistance between the porous composite layer in the cathode diffusion layer and the cathode catalyst layer.

In particular, in Cell O, both the anode and cathode catalyst layers had a modified layer including a needle-like second water-repellent resin material. Presumably because of this, the interface bonding strength between the catalyst layer and the porous composite layer was significantly improved, which suppressed an increase in the internal resistance. Further, the catalyst layer and the porous composite layer were unlikely to have space therebetween. As a result, the fuel diffused more uniformly in the anode catalyst layer, and therefore, a local increase in MCO and a reduction in power generation area were suppressed, while in the cathode, accumulation of produced water was prevented, and thus the diffusibility of oxidant gas was not reduced.

In contrast, the power density retention rates of Comparative cells 1 to 4 were much lower than those of Cells A to O.

Comparative cells 1 and 3 had no modified layer. Comparative cells 2 and 4 had a modified layer in which a flake-like water repellent resin material was present but no needle-like water repellent resin material was present. In short, none of Comparative cells had a modified layer including a needle-like water repellent resin material. Because of this, it was difficult to allow the anchor effect to appear, which reduced the interface bonding strength between the porous composite layer and the catalyst layer. Presumably as a result of this, the power density retention rate was significantly reduced.

It should be noted that although a direct methanol fuel cell was produced in the above Examples, the present invention is applicable to a fuel cell in which hydrogen gas is supplied to the anode and oxidant gas is supplied to the cathode.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The membrane electrode assembly and the fuel cell using the same of the present invention have excellent power generation performance and durability, and therefore, are applicable to, for example, the power source for portable small electronic devices, such as cellular phones, notebook personal computers, and digital still cameras, or the portable power source to be used as a replacement for an engine generator, in a construction site or disaster site, or for medical equipment. Further, the membrane electrode assembly and the fuel cell using the same of the present invention are also suitably applicable to the power source for electric scooters, automobiles, and the like.

| [Reference Signs List] | |
|---|---|
| 1 | Fuel cell |
| 10 | Electrolyte membrane |
| 11 | Anode |
| 12 | Cathode |
| 13 | Membrane electrode assembly (MEA) |
| 14 | Anode-side separator |
| 15 | Cathode-side separator |
| 16 | Anode catalyst layer |
| 17 | Anode diffusion layer |
| 17a | Conductive porous substrate |
| 17b | Porous composite layer |
| 17c | Modified layer |
| 18 | Cathode catalyst layer |
| 19 | Cathode diffusion layer |
| 19a | Conductive porous substrate |
| 19b | Porous composite layer |
| 19c | Modified layer |
| 20, 21 | Flow channel |
| 22 | Anode-side gasket |
| 23 | Cathode-side gasket |
| 24, 25 | Current collector plate |
| 26, 27 | Sheet heater |
| 28, 29 | Insulator plate |
| 30, 31 | End plate |
| 50 | Through pore |
| 50a | Throat portion |
| 51 | Galwick reagent |

The invention claimed is:

1. A membrane electrode assembly for a fuel cell, comprising an anode, a cathode, and an electrolyte membrane disposed between the anode and the cathode,
the anode including an anode catalyst layer laminated on one principal surface of the electrolyte membrane, and an anode diffusion layer laminated on the anode catalyst layer,
the cathode including a cathode catalyst layer laminated on the other principal surface of the electrolyte membrane, and a cathode diffusion layer laminated on the cathode catalyst layer,
at least one of the anode diffusion layer and the cathode diffusion layer including a conductive porous substrate, a porous composite layer laminated on the conductive porous substrate at a catalyst layer side, and a modified layer disposed on the porous composite layer at the catalyst layer side,
the porous composite layer including a conductive carbon material, and a first water-repellent resin material,
the modified layer including a second water-repellent resin material having a needle-like shape, and
the second water-repellent resin material having a weight average molecular weight higher than that of the first water-repellent resin material.

2. The membrane electrode assembly for a fuel cell in accordance with claim 1, wherein the first water-repellent resin material comprises flaky particles.

3. The membrane electrode assembly for a fuel cell in accordance with claim 1, wherein the second water-repellent resin material is a fluorocarbon polymer containing 95 wt % or more tetrafluoroethylene unit.

4. The membrane electrode assembly for a fuel cell in accordance with claim 1, wherein the second water-repellent resin material has a length in a major axis direction of 0.5 µm or more and a length in a minor axis direction of 0.05 to 0.1 µm.

5. The membrane electrode assembly for a fuel cell in accordance with claim 1, wherein the porous composite layer has an average thickness of 20 to 70 µm.

6. The membrane electrode assembly for a fuel cell in accordance with claim 1, wherein an amount of the modified layer disposed on the surface of the porous composite layer per unit projected area is 0.01 to 0.5 mg/cm$^2$.

7. The membrane electrode assembly for a fuel cell in accordance with claim 1, wherein the modified layer includes aggregates composed of the second water-repellent resin material, and the aggregates are distributed on the surface of the porous composite layer.

8. A membrane electrode assembly for a fuel cell, comprising an anode, a cathode, and an electrolyte membrane disposed between the anode and the cathode,
the anode including an anode catalyst layer laminated on one principal surface of the electrolyte membrane, and an anode diffusion layer laminated on the anode catalyst layer,
the cathode including a cathode catalyst layer laminated on the other principal surface of the electrolyte membrane, and a cathode diffusion layer laminated on the cathode catalyst layer,
at least one of the anode diffusion layer and the cathode diffusion layer including a conductive porous substrate, a porous composite layer laminated on the conductive porous substrate at a catalyst layer side, and a modified layer disposed on the porous composite layer at the catalyst layer side,
the porous composite layer including a conductive carbon material, and a first water-repellent resin material,
the modified layer including a second water-repellent resin material having a needle-like shape, and
at least one of the anode diffusion layer and the cathode diffusion layer having a plurality of through pores, and the through pores having a largest pore diameter of 15 to 20 µm and a mean flow pore diameter of 3 to 10 µm in pore throat size distribution as measured by a half-dry/bubble-point method.

9. A fuel cell comprising at least one unit cell which includes the membrane electrode assembly for a fuel cell of claim 1, an anode-side separator in contact with the anode, and a cathode-side separator in contact with the cathode.

10. The membrane electrode assembly for a fuel cell in accordance with claim 1, wherein the first water-repellent resin material comprises flaky particles.

11. The membrane electrode assembly for a fuel cell in accordance with claim 1, wherein the second water-repellent resin material has a weight average molecular weight higher than that of the first water-repellent resin material.

12. The membrane electrode assembly for a fuel cell in accordance with claim 1, wherein the second water-repellent resin material is a fluorocarbon polymer containing 95 wt % or more tetrafluoroethylene unit.

13. The membrane electrode assembly for a fuel cell in accordance with claim 1, wherein the second water-repellent resin material has a length in a major axis direction of 0.5 µm or more and a length in a minor axis direction of 0.05 to 0.1 µm.

14. The membrane electrode assembly for a fuel cell in accordance with claim 1, wherein the porous composite layer has an average thickness of 20 to 70 μm.

15. The membrane electrode assembly for a fuel cell in accordance with claim 1, wherein an amount of the modified layer disposed on the surface of the porous composite layer per unit projected area is 0.01 to 0.5 mg/cm$^2$.

16. The membrane electrode assembly for a fuel cell in accordance with claim 1, wherein the modified layer includes aggregates composed of the second water-repellent resin material, and the aggregates are distributed on the surface of the porous composite layer.

17. A fuel cell comprising at least one unit cell which includes the membrane electrode assembly for a fuel cell of claim 1, an anode-side separator in contact with the anode, and a cathode-side separator in contact with the cathode.

\* \* \* \* \*